United States Patent
Iwasaki

(10) Patent No.: US 11,809,494 B2
(45) Date of Patent: Nov. 7, 2023

(54) INFORMATION PROCESSING APPARATUS AND INFORMATION PROCESSING METHOD

(71) Applicant: Yahoo Japan Corporation, Tokyo (JP)

(72) Inventor: Masajiro Iwasaki, Tokyo (JP)

(73) Assignee: Yahoo Japan Corporation, Tokyo (JP)

( * ) Notice: Subject to any disclaimer, the term of this patent is extended or adjusted under 35 U.S.C. 154(b) by 171 days.

(21) Appl. No.: 17/179,317

(22) Filed: Feb. 18, 2021

(65) Prior Publication Data
US 2021/0406312 A1  Dec. 30, 2021

(30) Foreign Application Priority Data
Feb. 20, 2020 (JP) .................. 2020-027594

(51) Int. Cl.
*G06F 16/901* (2019.01)
*G06F 16/906* (2019.01)

(52) U.S. Cl.
CPC ........ *G06F 16/9024* (2019.01); *G06F 16/906* (2019.01)

(58) Field of Classification Search
CPC ............................ G06F 16/9024; G06F 16/906
See application file for complete search history.

(56) References Cited

U.S. PATENT DOCUMENTS

| | | | |
|---|---|---|---|
| 2016/0203623 A1* | 7/2016 | Maruyama | G06T 11/206 345/440 |
| 2018/0081937 A1* | 3/2018 | Broecheler | G06F 16/2322 |
| 2019/0311301 A1* | 10/2019 | Pyati | G06F 16/901 |

FOREIGN PATENT DOCUMENTS

| | | | |
|---|---|---|---|
| CN | 102799681 B | * | 11/2014 |
| JP | 2010079871 A | | 4/2010 |
| JP | 2011090351 A | | 5/2011 |

OTHER PUBLICATIONS

Google Patents English Language Translation of Feng (Year: 2014).*
Karande ("Speeding Up Algorithms on Compressed Web Graphs", Proceedings of the Second International Conference on Web Search and Web Data Mining, WSDM 2009, Feb. 2009) (Year: 2009).*

* cited by examiner

*Primary Examiner* — Apu M Mofiz
*Assistant Examiner* — Farhad Agharahimi
(74) *Attorney, Agent, or Firm* — Procopio, Cory, Hargreaves & Savitch LLP

(57) ABSTRACT

An information processing apparatus according to the application concerned includes an obtaining unit and a generating unit. The obtaining unit obtains a first-type graph including a plurality of node corresponding to a plurality of search target. The generating unit generates, based on placement of the plurality of nodes in the first-type graph, a second-type graph that includes a virtual node representing a node not associated to a search target by adding the virtual node to the first-type graph.

19 Claims, 11 Drawing Sheets

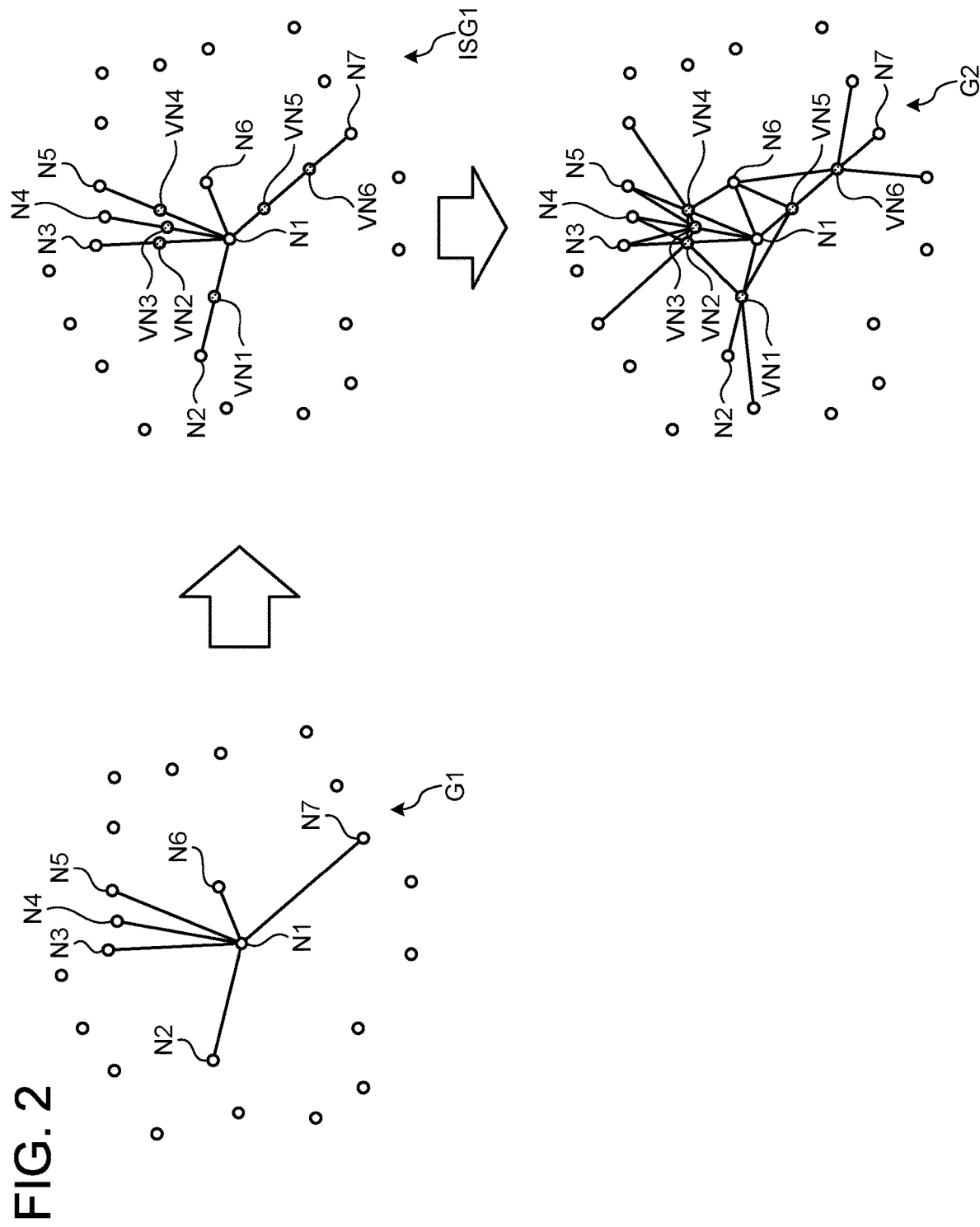

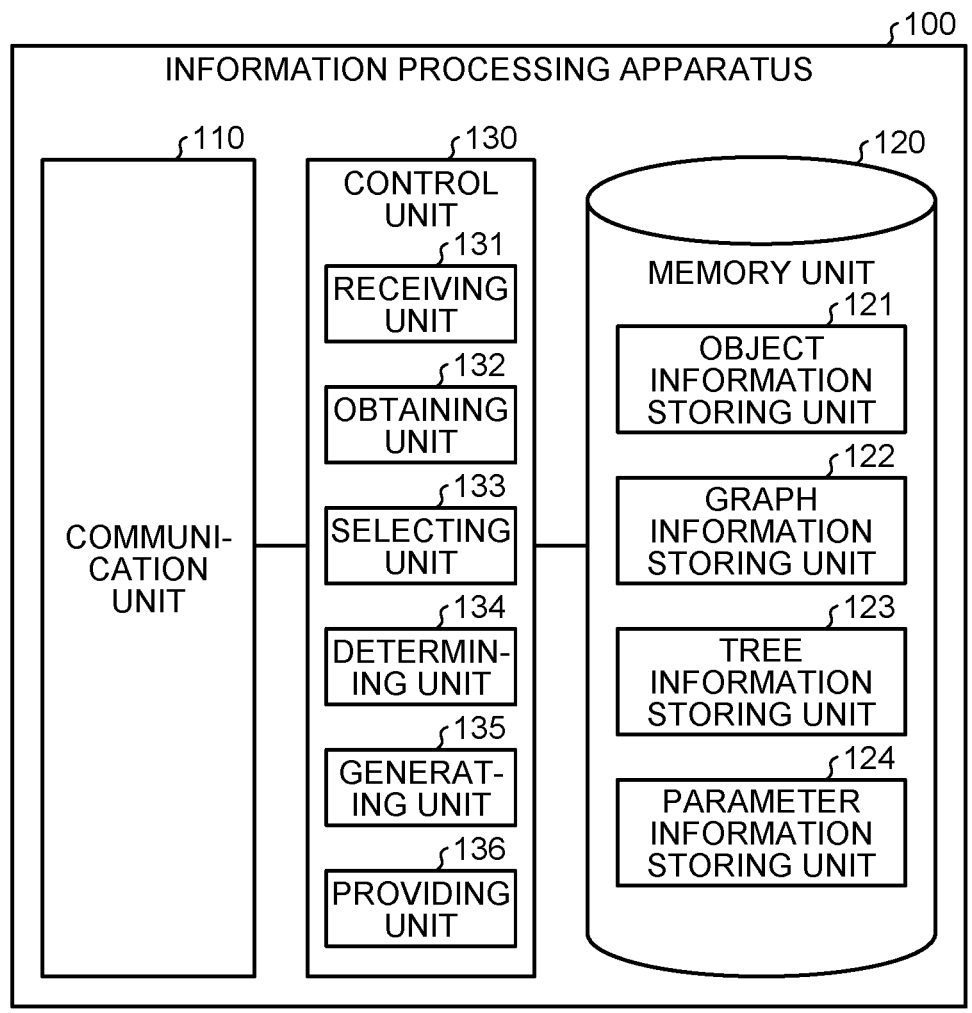

| NODE ID | OBJECT ID | EDGE INFORMATION | | | REAL-NODE FLAG | ... |
| --- | --- | --- | --- | --- | --- | --- |
| | | EDGE ID | REFERENCE DESTINATION | ... | | |
| N1 | OB1 | E1 | N2 | ... | 1 | ... |
| | | E2 | N53 | ... | | |
| | | ... | ... | ... | | |
| N2 | OB2 | E1 | N1 | ... | 1 | ... |
| | | E21 | N43 | ... | | |
| | | ... | ... | ... | | |
| ... | ... | ... | ... | ... | ... | ... |
| VN1 | NULL | EV1 | N1 | ... | 0 | ... |
| | | EV2 | VN2 | ... | | |
| | | ... | ... | ... | | |
| VN2 | NULL | EV2 | VN1 | ... | 0 | ... |
| | | EV21 | N1 | ... | | |
| | | ... | ... | ... | | |
| ... | ... | ... | ... | ... | ... | ... |

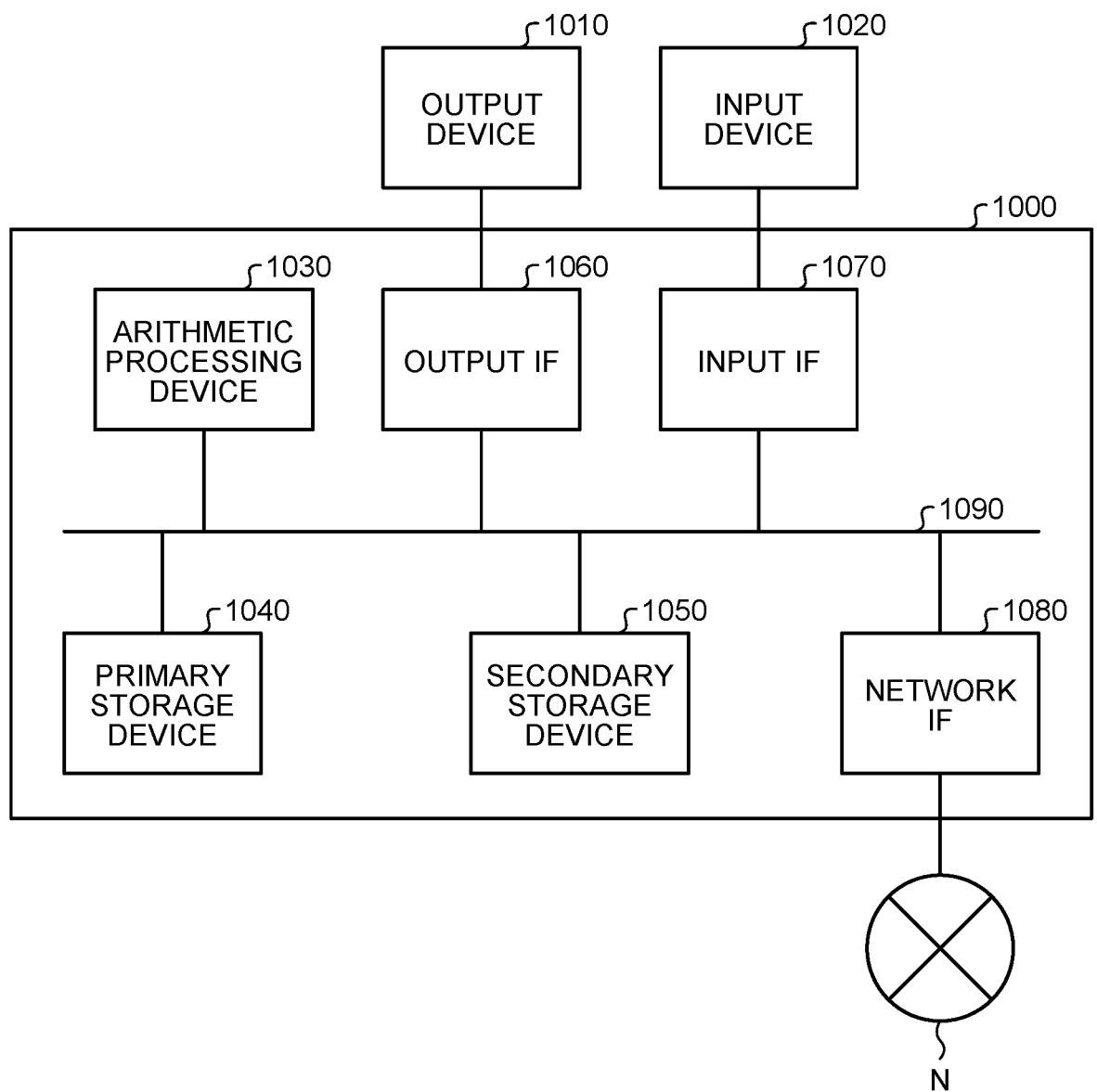

INFORMATION PROCESSING APPARATUS AND INFORMATION PROCESSING METHOD

CROSS-REFERENCE TO RELATED APPLICATIONS

This application claims priority to Japanese Patent Application No. 2020-027594 filed in Japan on Feb. 20, 2020, the entire contents of which are incorporated herein by reference.

BACKGROUND OF THE INVENTION

1. Field of the Invention

This disclosure relates to an information processing apparatus and an information processing method.

2. Description of the Related Art

With the advancement and the spread of the information technology, various search technologies have been proposed. For example, in order to retrieve data, which is similar to the provided data, from a dataset; various technologies enabling the nearest neighbor search have been proposed. In the nearest neighbor search technology in which the features of the data are used; based on the similarity of the features among sets of data, it is possible to search for data that is similar to the data provided as a query.

Examples of the target data for retrieval include multimedia data such as images, audios, and videos; and language data such as word embedding. Generally, the features of such data are expressed as high-dimensional vector data (for example, data in the dimension of $O(10^3)$). In that regard, in order to enable high-speed retrieval of high-dimensional vector data, various types of indexes have been proposed. One of the proposed indexes is a graph-based index (Patent Document 1, Patent Document 2).

A graph that is used as a graph-based index includes a node corresponding to the target data for retrieval and includes edges for connecting that node. Generally, similarity between two sets of data is indicated by the distance between those two sets of data. When the data of the search target (i.e., a query) is provided, the movement from the concerned node to another node that is close to the search target, from among the other nodes connected to the concerned node, is performed in a repeated manner; so that the closest node to the search target (i.e., the most similar data to the query) can be retrieved in an approximative manner.

However, in the conventional technologies mentioned above, sometimes the graph structure itself causes a decline in the search accuracy of the graph. For example, when the node that should be retrieved does not have other nodes in its neighborhood, it sometimes becomes difficult to search for the node that should be retrieved by tracing the graph.

SUMMARY OF THE INVENTION

According to one aspect of the subject matter described in this disclosure, an information processing apparatus includes: (i) an obtaining unit that obtains a first-type graph including a plurality of node corresponding to a plurality of search target, and (ii) a generating unit that generates, based on placement of the plurality of nodes in the first-type graph, a second-type graph that includes a virtual node representing a node not associated to a search target by adding the virtual node to the first-type graph.

BRIEF DESCRIPTION OF THE DRAWINGS

FIG. 2 is a diagram illustrating an example of a graph generation operation performed for generating a graph;

FIG. 3 is a diagram illustrating an exemplary configuration of an information processing apparatus according to the embodiment;

FIG. 4 is a diagram illustrating an example of an object information storing unit according to the embodiment;

FIG. 12 is a diagram illustrating an exemplary hardware configuration.

DETAILED DESCRIPTION

Figure 1:
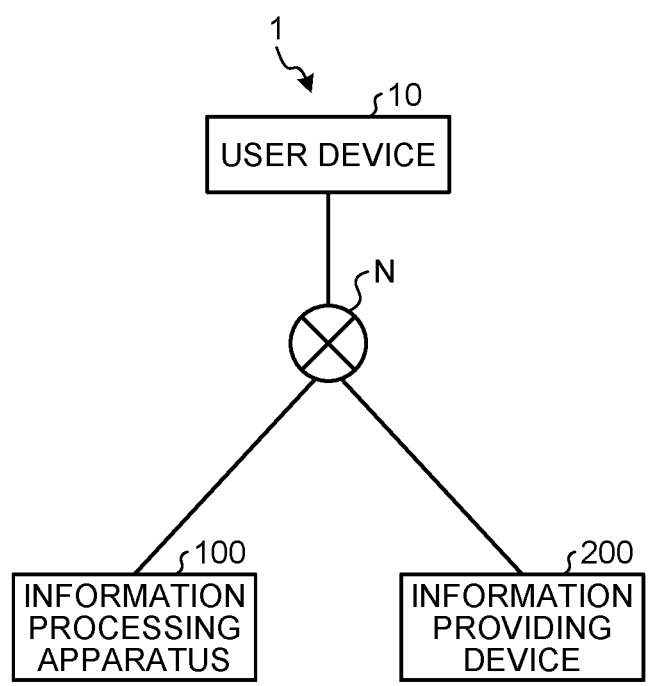
FIG. 1 is a diagram illustrating an exemplary configuration of an information retrieval system according to an embodiment.

An illustrative embodiment (hereinafter, called an embodiment) of an information processing apparatus and an information processing method according to the application concerned is described below in detail with reference to the accompanying drawings. However, the information processing apparatus and the information processing method according to the application concerned are not limited by the embodiment described below. The details of one or more embodiments are given with reference to the following explanation and the drawings. Moreover, a plurality of embodiments can be appropriately combined together without causing contradiction in the operation details.

Furthermore, in one or more embodiments described below, the identical portions are referred to by the same reference numerals, and the redundant explanation is not repeated.

1. Configuration of Information Retrieval System

Firstly, explained below with reference to FIG. 1 is a configuration of an information retrieval system according to the embodiment.

FIG. 1 is a diagram illustrating an exemplary configuration of the information retrieval system according to the embodiment. As illustrated in FIG. 1, an information retrieval system 1 according to the embodiment includes a user device 10, an information processing apparatus 100, and an information providing device 200.

In the information retrieval system 1; the user device 10, the information processing apparatus 100, and the information providing device 200 are connected to a network N in a wired manner or a wireless manner. The network N is, for example, the Internet. Although not illustrated in FIG. 1, the information retrieval system 1 can include a plurality of user devices 10, a plurality of information processing apparatuses 100, or a plurality of information providing devices 200.

The user device 10 is an information processing apparatus used by a user. The user device 10 is capable of requesting the information providing device 200 for a variety of information and receiving a variety of information from the information providing device 200. The user device 10 can be an information processing apparatus of an arbitrary type, such as a client device including a smartphone, a desktop personal computer (PC), a notebook PC, or a tablet PC.

The information providing device 200 is an information processing apparatus for providing information to users. In response to the requests for a variety of information as received from the user device 10, the information providing device 200 can request the information processing apparatus 100 to search for a variety of information. Moreover, according to the search result obtained by the information processing apparatus 100, the information providing device 200 can provide a variety of information to the user device 10. The information providing device 200 can be an information processing apparatus of an arbitrary type, such as a server.

The information processing apparatus 100 is an information processing apparatus that performs operations for information retrieval. For example, the information processing apparatus 100 is capable of generating an index to be used in a search. Moreover, the information processing apparatus 100 is capable of performing a search operation using the generated index. The information processing apparatus 100 can be an information processing apparatus of an arbitrary type, such as a server. The information processing apparatus 100 communicates with the user device 10 and the information providing device 200 in a wired manner or a wireless manner via the network N. A plurality of information processing apparatuses 100 can be configured to provide the functions of various types of servers such as a web server, an application server, and a database server.

For the purpose of illustration of the objective, assume that the information providing device 200 provides the user with a similar-fashion search service via a fashion image search application. In this example, the user becomes able to search for fashion merchandises in online shopping by the "characteristics of the appearance" from the contents in the fashion image search application installed in the user device 10 (for example, a smartphone). For example, when the intention is to search for an informal summer kimono having a floral pattern; the user can search for an informal summer kimono, as per his or her imagination, by the images that capture a floral informal summer kimono, such as product images, photographed images (for example, photographs taken by the user), illustrations, and pages of comics.

In the specific example given above, when an image in which a floral informal summer kimono is captured is received from the user device 10; the information providing device 200 extracts, from the image, the image features (for example, high-dimensional vector data) representing the details of the image. Then, the information providing device 200 sends the extracted image features in the form of a search query to the information processing apparatus 100. In response to receiving the search query, the information processing apparatus 100 performs a search through a fashion merchandise retrieval index in which fashion merchandises are associated to the image features of the images of fashion merchandises. Then, the information processing apparatus 100 provides the search result regarding the similar fashion to the information providing device 200. According to the search result provided thereto, the information providing device 200 becomes able to provide the user with fashion merchandises having a similar appearance to the floral informal summer kimono captured in the concerned image.

The information processing apparatus 100 according to the embodiment can generate a graph as an index that is usable in a variety of information retrieval, such as during a similar image search as explained above. More particularly, the information processing apparatus 100 can generate a neighborhood graph as a graph-based search index. Regarding the generation of a neighborhood graph, the detailed explanation is given below with reference to FIG. 2.

2. Graph Generation Operation

Explained below with reference to FIG. 2 is a graph generation operation according to an exemplary embodiment.

FIG. 2 is a diagram illustrating an example of the graph generation operation performed for generating a graph. In the example illustrated in FIG. 2, the graph generation operation performed for generating a neighborhood graph is performed by the information processing apparatus 100 in the information retrieval system 1 explained above.

2-1. Overview of Exemplary Embodiment

In a search in which a graph-based index is used, a node in the graph corresponds to the target object for retrieval and is connected to neighboring nodes by edges. However, when a query is received, there are times when the node that should be retrieved is not retrieved because no other nodes are present in the neighborhood of that node. In that regard, the information processing apparatus 100 according to the exemplary embodiment adds virtual nodes in the graph, so as to make it easier to search for the nodes that are otherwise difficult to retrieve. As a result, the information processing apparatus 100 becomes able to generate new search paths, which results in improving the search accuracy of the graph.

2-2. Introduction to Exemplary Embodiment

In the example illustrated in FIG. 2, the information providing device 200 in the information retrieval system 1 illustrated in FIG. 1 registers the target data for retrieval in the information processing apparatus 100. For example, the information providing device 200 extracts features from still images, dynamic picture images (videos), audios, and documents. Then, the information providing device 200 registers, in the information processing apparatus 100, the extracted features as "objects" expressed using vector data. For example, in the memory area in the information processing apparatus 100, an object is stored in a corresponding manner to the ID of a set of data. Moreover, in response to receiving a search request from the user device 10 in the information retrieval system 1 illustrated in FIG. 1, the information providing device 200 sends a "query object", which is expressed using a vector, in the form of a query to the information processing apparatus 100. In the specific example explained above with reference to FIG. 1, the registered objects represent the image features of the images of fashion merchandises, and the query object represents the image features of the image in which a floral informal summer kimono is captured.

In the example illustrated in FIG. 2, in response to receiving a query object from the information providing device 200, the information processing apparatus 100 searches the registered objects for the closest object to the query object. Meanwhile, the distance between two objects is expressed as a distance function. Examples of the distance function include the Euclidean distance and the cosine similarity. Generally, shorter the distance between two objects, the higher is the similarity between them.

When an object is retrieved simply according to a linear search, the amount of calculation is proportional to the number of objects and the number of dimensions. Hence, when there is a large number of dimensions and a large number of objects, sometimes the linear search takes an immense amount of time. In the specific example explained above with reference to FIG. 1, it is possible to think that the number of fashion merchandises in online shopping is approximately in the scale of "$10^8$ (million scale)", and that the number of dimensions of the image features of the images of the fashion merchandises is approximately in the scale of "$10^3$". For example, when the search algorithm compares the distances from $10^8$ number of $10^3$-dimensional vectors to the query vector that is a $10^3$-dimensional vector, and then selects the closest object to the query object; the increase in the amount of calculation can become an issue.

In order to deal with such an increase in the amount of calculation, conventionally, the approximate nearest neighbor search has been proposed. The approximate nearest neighbor search is used to "approximatively" search a data set for data that is similar to the provided data. Examples of the methods of approximate nearest neighbor search include a method in which a graph-based index is used; a method in which a tree-based index is used (for example, a vantage point tree); a method in which hashing is used (for example, locality sensitive hashing); and a method in which quantization is used (for example, product quantization).

The search accuracy of a graph-based index generally tends to be higher among the abovementioned methods of the approximate nearest neighbor search. In the method in which a graph-based index is used, a neighborhood graph (hereinafter, called a "graph") is generated as a graph-based index. For example, in the example illustrated in FIG. 2, as a result of generating a graph, the closest object to the query object can be searched in an approximative manner. In the example illustrated in FIG. 2, the graph generated from the objects includes the objects as "nodes". Moreover, a graph includes "edges" that connect the nodes. The nodes in a graph correspond to the objects in the vector space.

As explained above, the object associated to the target data for retrieval can express the features of the target data for retrieval in the form of vector data. On the other hand, a query object can express the features of the target data for search in the form of vector data. Thus, in the vector space of objects, a node corresponds to the target data for retrieval. On the other hand, in the vector space of the objects, the query object corresponds to the target data for search. In the specific example explained above with reference to FIG. 1, the object or the node corresponds to the target fashion merchandise for retrieval (i.e., an example of the target data for retrieval), and the query object corresponds to a query image in which the floral informal summer kimono is captured (i.e., an example of the target data for search).

In a graph, a node is connected to a plurality of neighboring nodes present around it. When the query object is received, the neighboring nodes of the query object are retrieved by traversing the nodes in the graph.

Regarding an example of exploring a graph; for example, firstly, a search start node (hereinafter, called a "search start point") is selected. The search start point is a node that is roughly close to the query object. For example, the search start point can be selected using a tree-based index that is stored in a tree information storing unit 123 explained later with reference to FIG. 3. The search start point can be any arbitrary node. Meanwhile, as the search start point, an arbitrary node can be selected without using the tree-based index. Then, the search point moves to such a node that, from among the nodes connected to the search start point by edges, is closest to the query object. In this way, the search point greedily moves toward the query object. As a result of repeating such movement, a neighboring node to the query object is retrieved.

However, the structure of the graph is generally dependent on the dataset of the registered objects. Thus, depending on the dataset, there are times when nodes that are difficult to retrieve get generated. For example, when the node that should be retrieved does not have other nodes in its neighborhood, there are times when the node that should be retrieved is not retrieved. In this way, nodes that are isolated in the graph may lead to omissions in the search.

In the example regarding the greedy search explained above, since the node that should be retrieved does not have other nodes in its neighborhood, there are times when the search point reaches a local neighboring node that is different than a neighboring node of the query object representing the node that should be retrieved. In the specific example explained above with reference to FIG. 1, for example, when a plurality of nodes corresponding to a plurality of informal summer kimonos having various designs (for example, animal designs) is not present in the neighborhood of the node corresponding to the floral informal summer kimono, sometimes the search point may not move in the correct direction. In such a case, local neighboring nodes (for example, nodes corresponding to floral Japanese male skirts or floral long-sleeved kimonos) get retrieved as the objects corresponding to the floral informal summer kimono.

In that regard, in the exemplary embodiment, the information processing apparatus 100 performs a graph generation operation, which is explained below, in order to improve the search accuracy of the graph.

2-3. Flow of Operations Performed in Information Processing Apparatus

Explained below with reference to FIG. 2 is the flow of operations performed in the information processing apparatus 100 according to the exemplary embodiment.

In the exemplary embodiment, the graph generation operation includes the following three steps: 1) selection of the target node for processing from an already-generated graph; 2) addition of virtual nodes in the already-generated graph; and 3) assignment of edges to the virtual nodes. The first step, the second step, and the third step respectively correspond to the initial state, the intermediate state, and the final state of the graph. In the example illustrated in FIG. 2, a new graph G2 is generated from an already-generated graph G1 via an intermediate state graph ISG1. In FIG. 2, a "white arrow" indicates that the graph generation operation proceeds to the next step.

2-3-1. Selection of Target Node for Processing

In the first step, the information processing apparatus 100 performs a node selection operation for selecting the target node for processing from an already-generated graph. The target node for processing represents the node to be subjected to a "virtual node addition operation" explained later. Given below is the example of various implementation forms of the "node selection operation".

Firstly, the information processing apparatus 100 obtains an already-generated graph. The already-generated graph can be a graph generated using various known graph generation algorithms explained later with reference to a "generating unit 135 illustrated in FIG. 3". For example, the already-generated graph can be a graph generated using an ANNG (Approximate k-Nearest Neighbor graph) index generation algorithm.

In the ANNG index generation algorithm, objects are gradually added to an ANNG. Then, the neighboring nodes of each added object are retrieved using the partially-generated ANNG. The retrieved neighboring nodes are then connected by edges to the node corresponding to the added object. As a result of searching for nodes using the partially-generated ANNG, it becomes possible to generate the ANNG with less amount of calculation. The ANNG is generated in such a way that each nodes get connected to the corresponding neighboring nodes by edges. Regarding a node search operation performed using graph data such as an ANNG (for example, a k-nearest neighbor search), the detailed explanation is given later with reference to FIG. 7.

The already-generated graph includes a plurality of nodes corresponding to a plurality of objects. A node included in the already-generated graph is connected to a plurality of neighboring nodes by respective edges. The edges in the already-generated graph can be directed edges or undirected edges. There are two types among the directed edges. One type of directed edges are output edges and the other type of directed edges are input edges. The "output edge" assigned to a particular node enables moving from that node to another node. For example, the search point can trace the output edge of a particular node from that particular node to another node. On the other hand, the "input edge" assigned to a particular node enables moving from another node to the concerned node. For example, the search point can trace the output edge of a particular node from another node to the concerned node.

When the output edge of a particular node enables moving from that node to another specific node, the concerned node refers to the other specific node as a neighboring node. That is, the output edge of a particular node indicates the node serving as a neighboring node of the concerned node.

Meanwhile, the undirected edges are also called bidirected edges and can be treated as two directed edges, namely, an output edge and an input edge. Thus, assigning a directed edge to a node can include assigning an undirected edge to that node. The number of output edges and the number of input edges can be adjusted using various known graph generation algorithms explained later with reference to the "generating unit 135 illustrated in FIG. 3". For example, the already-generated graph can be a graph generated using an ONNG (Optimized Nearest Neighbor graph) index generation algorithm. In that case, the number of output edges and the number of input edges can be adjusted based on the accuracy of the search and the time taken for the search.

In the example illustrated in FIG. 2, the information processing apparatus 100 obtains the already-generated graph G1 from the internal memory area. As illustrated in the example in FIG. 2, the graph G1 includes nodes N1, N2, N3, N4, N5, N6, and N7. Moreover, the graph G1 also includes nodes other than the nodes N1, N2, N3, N4, N5, N6, and N7. The node N1 is connected to the nodes N2, N3, N4, N5, N6, and N7 by respective edges.

In the example illustrated in FIG. 2, a node is drawn as a "circle", and an edge is drawn as a "line". Herein, the edges drawn as lines can be directed edges or undirected edges. Thus, the edge assigned to a node can be either an output edge, or an input edge, or a bidirected edge.

Then, the information processing apparatus 100 selects the target node for processing from among the nodes in the already-generated graph.

In the exemplary embodiment, the information processing apparatus 100 selects, as the target node for processing, a node that is difficult to retrieve from among the nodes in the already-generated graph. A node that is difficult to retrieve is a node separated from all other nodes. For example, a node that is difficult to retrieve is isolated from all other nodes. When the vector space of the objects has high dimensionality, it sometimes leads to a situation in which a particular node becomes isolated from all other nodes.

In the example illustrated in FIG. 2, the information processing apparatus 100 selects the node N1 as the target node for processing. As illustrated in the example in FIG. 2, the node N1 is a "lone" node in the graph G1 (i.e., an isolated node in the graph G1).

As an example, the information processing apparatus 100 selects, as the target node for processing, a node that is not connected to any short edge. That is because, when a node is not connected to any short edge, that node is highly likely to be an isolated node which does not have other nodes in its neighborhood. For example, from among the edges assigned to a node, when the length of the shortest edge satisfies a threshold value, the information processing apparatus 100 does not select that node as the target node for processing. On the other hand, from among the edges assigned to a node, when the length of the shortest edge does not satisfy the threshold value, the information processing apparatus 100 selects that node as the target node for processing.

As another example, the information processing apparatus 100 calculates the distances between all pairs of nodes in the already-generated graph. When the distance between a particular node and at least one other node satisfies a predetermined condition regarding the selection of the target node for processing, the information processing apparatus 100 selects that particular node as the target node for processing. The predetermined condition regarding the selection of the target node for processing can be, for example, the condition indicating that "from among the distances between pairs of a particular node and another node, the shortest distance does not satisfy the threshold value" (i.e., the concerned node is separated from all other nodes).

As yet another example, the information processing apparatus 100 uses a test set meant for evaluating the search accuracy, and identifies the nodes omitted from the search result. For example, the test set includes a query vector representing the instance, and includes a label associated to the query vector. The label represents the node that should be retrieved using the query vector. For example, the information processing apparatus 100 uses the already-generated graph to randomly search for the neighboring nodes of the query vector. Then, the information processing apparatus 100 identifies the nodes that were not retrieved using the query vector. Subsequently, the information processing apparatus 100 selects, as the target node for processing, a node that was actually omitted from the search result. Meanwhile, the information processing apparatus 100 can generate a test set from the nodes of the already-generated graph. For example, the information processing apparatus 100 can select arbitrary two or more nodes from the nodes in the already-generated graph, and can calculate an intermediate point of the selected arbitrary two or more nodes as the query vector. In that case, a node indicated by a label can be at least one node from among the selected arbitrary two or more nodes. Alternatively, instead of selecting arbitrary two or more nodes, the information processing apparatus 100 can select a plurality of nearest neighboring nodes from among the nearest neighboring nodes of a single node, and can calculate an intermediate point of the selected nearest neighboring nodes as the query vector. In that case, a node indicated by a label can point to that single node.

2-3-2. Addition of Virtual Nodes

In the second step, the information processing apparatus 100 performs a virtual node addition operation for adding virtual nodes in the already-generated graph. After selecting the target node for processing, the information processing apparatus 100 adds virtual nodes in the already-generated graph so as to ensure that the target node for processing (i.e., the node that tends to get omitted from the search result) becomes easier to retrieve.

The information processing apparatus 100 can add virtual nodes in the already-generated graph by generating new objects (for example, sets of vector data) as the virtual nodes. Thus, adding a virtual node can include generating a new object expressed using a set of vector data. In some implementations, the information processing apparatus 100 adds virtual nodes in the already-generated graph and generates an intermediate state graph. The term "intermediate state graph" can include a data set having objects corresponding to the real nodes and having new objects corresponding to the virtual nodes. For example, adding a virtual node can include generating a new dataset that includes a new object corresponding to that virtual node. Moreover, adding a virtual node can include adding a new object, which corresponds to that virtual node, to the dataset.

By adding virtual nodes in a graph, the information processing apparatus 100 can prevent omissions in the search and hence can improve the search accuracy of the graph. Given below is the explanation of various implementation forms of "addition of virtual nodes".

A virtual node is a node that is "not" associated to the target data for retrieval that has been registered. A virtual node constitutes a search path in an identical manner to a normal node. However, when the object to be retrieved corresponds to the node associated to the registered target data for retrieval, the new object corresponding to a virtual node is not treated as the target object for retrieval. In that case, the virtual node is a node which is not returned as the search result.

Since an object corresponds to a node, the terms "object" and "node" can be used synonymously in the present written description. However, a new object corresponding to a "virtual node" may or may not correspond to the target object for retrieval. As explained later, when a neighboring node of a virtual node is retrieved for the purpose of assigning an edge to that virtual node, the new object corresponding to the virtual node represents the target object for retrieval. That is because a neighboring node of a virtual node can be another virtual node. In that case, the virtual nodes can be included in the search result. On the other hand, when the nodes associated to the registered target data for retrieval are retrieved, a new object corresponding to a "virtual node" does not represent the target object for retrieval. In that case, the virtual nodes are not included in the search result. In order to distinguish between the nodes associated to the registered target data for retrieval and virtual nodes; in the present written description, the nodes associated to the registered target data for retrieval are sometimes called "real nodes".

In short, an object corresponds to either a real node or a virtual node. For example, when a neighboring node is retrieved for the purpose of assigning an edge to a virtual node, the object to be retrieved (i.e., the target object for retrieval in the graph exploration) corresponds to either a real node or a virtual node. In other words, when the objects corresponding to virtual nodes are indexed, there are times when the object to be retrieved corresponds to a virtual node. However, for example, in the specific example explained above with reference to FIG. 1, since the "object to be retrieved" corresponds to the target fashion merchandise for retrieval, it does not correspond to a virtual node.

In the information processing apparatus 100, at the time of adding a virtual node, in order to distinguish between the real nodes (i.e., the nodes associated to the target data for retrieval that has been registered) and the virtual node (i.e., the node "not" associated to the registered target data for retrieval), a flag is assigned to the added virtual node. For example, the information processing apparatus 100 assigns a real-node flag "0" to the virtual node. Moreover, the information processing apparatus 100 can also assign a real-node flag "1" to the real nodes.

Since the real-node flag is assigned to the virtual nodes, the information processing apparatus 100 can trace the graph, which includes virtual nodes, in such a way that the virtual nodes are not included in the search result. As explained later, the information processing apparatus 100 can implement various known search algorithms (for example, the k-nearest neighbor search) and search the neighboring nodes of the query object. In the case of exploring a graph that includes virtual nodes; based on the real-node flag assigned to the nodes, the information processing apparatus 100 can determine whether a node is a real node. If a node is a virtual node, then the information processing apparatus 100 can exclude that node from the search result. Regarding a real-node search operation performed using graph data that contains virtual nodes, the detailed explanation is given later with reference to FIG. 8.

The information processing apparatus 100 according to the embodiment can add virtual nodes based on "the distances between the target node for processing and the other nodes". For example, based on the distances between the target node for processing and the neighboring nodes of the target node for processing, the information processing apparatus 100 can add virtual nodes around the target node for processing.

In the exemplary embodiment, the information processing apparatus 100 adds virtual nodes based on "the length of an edge assigned to the target node for processing". For example, for each target node for processing that is selected, the information processing apparatus 100 generates, as virtual nodes, objects that are having the count in accordance with the length of an edge assigned to the target node for processing. The generated virtual nodes can be equidistantly placed on that edge assigned to the target node for processing. Alternatively, the generated virtual nodes can be placed more toward the target node for processing. In the example illustrated in FIG. 2, longer an edge assigned to the target node for processing, the greater is the number of virtual nodes placed on that edge.

As an example, the information processing apparatus 100 determines whether the length of an edge assigned to the target node for processing satisfies predetermined conditions regarding the addition of virtual nodes. For example, the predetermined conditions regarding the addition of virtual nodes can include a first condition indicating that "the length of the edge exceeds a first threshold value" and a second condition indicating that "the length of the edge exceeds a second threshold value that is higher than the first threshold value". When it is determined that the length of an edge assigned to the target node for processing satisfies the predetermined conditions regarding the addition of virtual nodes, the information processing apparatus 100 adds virtual nodes. For example, when it is determined that the length of an edge satisfies the first condition, the information processing apparatus 100 can add a single virtual node. When it is determined that the length of that edge satisfies the second condition, the information processing apparatus 100 can add two virtual nodes. Herein, the information processing apparatus 100 can calculate the number of virtual nodes by dividing "the length of the edge before assigning virtual nodes" by "the maximum length of the edge after assigning virtual nodes".

In the example illustrated in FIG. 2, the information processing apparatus 100 adds virtual nodes VN1, VN2, VN3, VN4, VN5, and VN6 in the graph G1. In this way, the information processing apparatus 100 generates the intermediate state graph ISG1 from the graph G1.

Meanwhile, the information processing apparatus 100 can decide on the number of virtual nodes, which are to be added, based on the distribution of the distances between pairs of nodes in the already-generated graph. For example, the information processing apparatus 100 can calculate the distances between all pairs of nodes in the already-generated graph and generate a distance distribution for the nodes in the graph. Then, based on the generated distance distribution for the nodes, the information processing apparatus 100 can decide on the number of virtual nodes to be added. For example, with reference to the average distance between arbitrary two nodes, the information processing apparatus 100 can accordingly decide on the number of virtual nodes to be added. In the example illustrated in FIG. 2, for example, if the distance between the target node for processing and another node exceeds the average distance, then the information processing apparatus 100 can decide on the value "2" as the number of virtual nodes to be added. On the other hand, if the distance between the target node for processing and another node is shorter than the average distance, then the information processing apparatus 100 can decide on the value "1" as the number of virtual nodes to be added. Alternatively, the information processing apparatus 100 can calculate the number of virtual nodes by dividing "the length of the edge before assigning virtual nodes" by "the average distance".

2-3-3. Assignment of Edges

In the third step, the information processing apparatus 100 performs an edge assignment operation for assigning edges to the virtual nodes. After adding a virtual node, the information processing apparatus 100 connects the virtual node and the neighboring nodes of the virtual node by edges, and generates a new graph. In an identical manner to the case of the real nodes, the information processing apparatus 100 can implement various known graph generation algorithms (for example, the ANNG index generation algorithm), and connect the virtual node to the neighboring nodes thereof by edges. As a result, the information processing apparatus 100 can generate a new graph from the intermediate state graph.

Regarding the ANNG index generation algorithm, the information processing apparatus 100 gradually adds new objects, which correspond to the virtual nodes, as the target objects for search in the already-generated graph. In other words, the information processing apparatus 100 sequentially registers virtual nodes in the already-generated graph. For example, the information processing apparatus 100 obtains a new object, which corresponds to the target virtual node for processing, from the database. Then, the information processing apparatus 100 performs a node search using the partially-generated ANNG and searches for the neighboring nodes of the concerned virtual node. As a result, the information processing apparatus 100 becomes able to connect the retrieved neighboring nodes and the virtual node by edges. Regarding the node search performed using the partially-generated ANNG (for example, the k-nearest neighbor search), the detailed explanation is given later with reference to FIG. 7. Meanwhile, the information processing apparatus 100 can delete the original edges on which the virtual nodes were placed.

In the example illustrated in FIG. 2, the information processing apparatus 100 assigns edges to the virtual nodes VN1, VN2, VN3, VN4, VN5, and VN6. In this way, the information processing apparatus 100 generates the graph G2 from the intermediate state graph ISG1.

2-4. Effect of Exemplary Embodiment

As explained above, the information processing apparatus 100 according to the exemplary embodiment selects, as the target node for processing, a node that is difficult to retrieve from among the nodes in an already-generated graph. Then, the information processing apparatus 100 adds virtual nodes in the already-generated graph, so that the target node for processing becomes easier to retrieve. As a result, the information processing apparatus 100 can enhance the possibility of discovery of a path to the node that is difficult to retrieve, thereby enabling achieving improvement in the search accuracy of the graph.

Given below is the detailed explanation of the information processing apparatus 100 that performs the graph generation operation as explained above.

3. Configuration of Information Processing Apparatus

Explained below with reference to FIG. 3 is an exemplary configuration of the information processing apparatus 100 according to the embodiment. FIG. 3 is a diagram illustrating an exemplary configuration of the information processing apparatus 100 according to the embodiment. As illustrated in FIG. 3, the information processing apparatus 100 includes a communication unit 110, a memory unit 120, and a control unit 130. Moreover, the information processing apparatus 100 can include an input unit (for example, a keyboard or a mouse) that receives various operations from the administrator of the information processing apparatus 100, and a display unit (such as a liquid crystal display) for displaying a variety of information.

Communication Unit 110

The communication unit 110 is implemented using, for example, a network interface card (NIC). The communication unit 110 is connected to a network in a wired manner or a wireless manner, and communicates information with the user device 10 and the information providing device 200 via the network.

Memory Unit 120

The memory unit 120 is implemented using, for example, a semiconductor memory such as a random access memory (RAM) or a flash memory; or a memory device such as a hard disk or an optical disk. As illustrated in FIG. 3, the memory unit 120 includes an object information storing unit 121, a graph information storing unit 122, the tree information storing unit 123, and a parameter information storing unit 124.

In order to enable the generation of graphs as explained above with reference to FIG. 2, a predetermined memory area in the memory unit 120 can be implemented as a large-capacity memory. In addition to that or as an alternative to that, a predetermined memory area in the memory unit 120 can be implemented as a solid state drive (SSD). In some implementations, the objects (i.e., sets of object data) are placed in such predetermined memory area (for example, a large-capacity memory).

Object Information Storing Unit 121

FIG. 4 is a diagram illustrating an example of the object information storing unit 121 according to the embodiment. The object information storing unit 121 according to the embodiment is used to store a variety of information regarding the objects. For example, the object information storing unit 121 is used to store object IDs and sets of vector data for each dataset. The object information storing unit 121 illustrated in FIG. 4 includes the following items: "dataset ID", "object ID", and "vector data".

A "dataset ID" represents identification information enabling identification of a dataset. An "object ID" represents identification information enabling identification of an object. The "vector data" represents a set of vector data corresponding to the object identified by an object ID. That is, in the example illustrated in FIG. 4, sets of vector data corresponding to the objects are registered in a corresponding manner to the object IDs of those objects.

In the example illustrated in FIG. 4, it is indicated that, the dataset identified by a dataset ID "DS1" (i.e., in a dataset DS1) includes a plurality of objects identified by object IDs "OB1" and "OB2". The object identified by the object ID "OB1" (i.e., an object OB1) is associated to a set of multidimensional vector information "10, 24, 51, 2, . . . ". Moreover, the object identified by the object ID "OB2" (i.e., an object OB2) is associated to a set of multidimensional vector information "32, 1, 120, 31, . . . ".

Meanwhile, the information stored in the object information storing unit 121 is not limited to the information given above, and a variety of other information can be stored in it depending on the objective.

The object information storing unit 121 can be used to store a variety of information regarding the objects corresponding to the virtual nodes. In this case, the objects can have the real-node flag associated thereto. The objects corresponding to the real nodes can have the real-node flag "1" associated thereto, and the objects corresponding to the virtual nodes can have the real-node flag "0" associated thereto. The object information storing unit 121 can be used to store datasets each including objects corresponding to the real nodes and new objects corresponding to the virtual nodes. In the object information storing unit 121, such a dataset generated by the generating unit 135 (described later) can be stored as an intermediate state graph.

Graph Information Storing Unit 122

Figure 5:
FIG. 5 is a diagram illustrating an example of a graph information storing unit according to the embodiment.

FIG. 5 is a diagram illustrating an example of the graph information storing unit 122 according to the embodiment. The graph information storing unit 122 according to the embodiment is used to store a variety of information regarding graphs. For example, the graph information storing unit 122 is used to store graph information to be used in the information processing of search operations. In the example illustrated in FIG. 5, the graph information storing unit 122 is used to store neighborhood graph data. The graph information storing unit 122 illustrated in FIG. 5 includes the following items: "node ID", "object ID", "edge information", and "real-node flag". The "edge information" contains "edge ID" and "reference destination".

A "node ID" represents identification information enabling identification of a node (object) in the graph data. An "object ID" represents identification information enabling identification of an object.

The "edge information" represents information regarding the edges connected to the concerned node. In the example illustrated in FIG. 5, the "edge information" represents information regarding the undirected edges (bidirected edges) joined to the concerned node. An "edge ID" represents information enabling identification of an edge that joins nodes. A "reference destination" represents information indicating the reference destination (node) joined by the corresponding edge. Thus, in the example illustrated in FIG. 5, a node ID, which enables identification of a node, is registered in a corresponding manner to: the information enabling identification of the object corresponding to that node; and the reference destinations (nodes) that are joined by the edges from that node.

In the example illustrated in FIG. 5, the node ID identified by a node ID "N1" (i.e., a node N1) corresponds to an object identified by the object ID "OB1". Moreover, from the node N1, an edge identified by an edge ID "E1" (i.e., an edge E1) is joined to a node identified by a node ID "N2" (i.e., a node N2). Thus, in the example illustrated in FIG. 5, in the graph information, the node N2 can be traced from the node N1 using the edge E1. Furthermore, from the node N1, an edge identified by an edge ID "E2" (i.e., an edge E2) is joined to a node identified by a node ID "N53" (i.e., a node N53). That is, in the example illustrated in FIG. 5, in the graph information, the node N53 can be traced from the node N1 using the edge E2.

Moreover, in the example illustrated in FIG. 5, the node identified by the node ID "N2" (i.e., the node N2) corresponds to the object identified by the object ID "OB2". Furthermore, from the node N2, the edge identified by the edge ID "E1" (i.e., the edge E1) is joined to the node identified by the node ID "N1" (i.e., the node N1). That is, in the example illustrated in FIG. 5, in the graph information, the node N1 can be traced from the node N2 using the edge E1.

Meanwhile, the "real-node flag" indicates whether the concerned node is a real node. In the example illustrated in FIG. 5, the node identified by the node ID "N1" (i.e., the node N1) is a real node. On the other hand, the node identified by a node ID "VN1" (i.e., the node VN1) is not a real node. That is, the node identified by the node ID "VN1" (i.e., the node VN1) is a virtual node.

The information stored in the graph information storing unit 122 is not limited to the information given above, and a variety of other information can be stored in it depending on the objective. For example, the graph information storing unit 122 can be used to store the lengths of the edges joining the nodes (vectors). That is, the graph information storing unit 122 can be used to store information indicating the distances between the pairs of nodes (vectors). The graph information storing unit 122 is not limited to be used in storing the graph information joined by undirected edges, and can be used to store a variety of other graph information. The graph information storing unit 122 can be used to store the graph information joined by directed edges.

Tree Information Storing Unit 123

The tree information storing unit 123 according to the embodiment is used to store a variety of information regarding trees, such as tree-based indexes. The tree information storing unit 123 is used to store tree information having the tree structure of a vantage point (VP) tree. For example, the tree information storing unit 123 includes the following items: "root hierarchy", "first hierarchy", "second hierarchy", and "third hierarchy". Meanwhile, it is not limited to have the items from the "first hierarchy" to the "third hierarchy", and can include items such as "fourth hierarchy", "fifth hierarchy", "sixth hierarchy", and so on depending on the number of hierarchies in a tree.

The "root hierarchy" represents the hierarchy of the root (the most significant level) that serves as the starting point for deciding on the source node using a tree. The "first hierarchy" is used to store the information enabling identification of the nodes (the node points or the vectors in the graph information) belonging to the first hierarchy of the tree. The nodes stored in the "first hierarchy" correspond to the hierarchy that is directly linked to the root of the tree.

The "second hierarchy" is used to store the information enabling identification of the nodes (the node points or the vectors in the graph information) belonging to the second hierarchy of the tree. The nodes stored in the "second hierarchy" correspond to the hierarchy immediately beneath the first hierarchy and are linked to the nodes in the first hierarchy. The "third hierarchy" is used to store the information enabling identification of the nodes (the node points or the vectors in the graph information) belonging to the third hierarchy of the tree. The nodes stored in the "third hierarchy" correspond to the hierarchy immediately beneath the second hierarchy and are linked to the nodes in the second hierarchy.

Meanwhile, the information stored in the tree information storing unit 123 is not limited to the information given above, and a variety of other information can be stored in it depending on the objective.

Parameter Information Storing Unit 124

The parameter information storing unit 124 according to the embodiment is used to store a variety of information regarding the parameters of a graph. For example, the parameter information storing unit 124 is used to store the parameter information regarding the parameters used in generating a graph. The parameter information can indicate predetermined conditions (for example, various threshold values) used in generating a graph. The parameter information storing unit 124 can be used in storing parameter information regarding the parameters to be used in searching a graph. The parameter information storing unit 124 can be used in storing a predetermined number ks that is explained later with reference to FIGS. 7 and 8.

Control Unit 130

The control unit 130 is a controller that is implemented when, for example, a processor such as a central processing unit (CPU) or a micro processing unit (MPU) executes various computer programs (equivalent to an example of an information processing program), which are stored in the internal memory device of the information processing apparatus 100, using a RAM as the work area. Alternatively, the control unit 130 can be a controller implemented using, for example, an integrated circuit such as an application-specific integrated circuit (ASIC), a field-programmable gate array (FPGA), or a general purpose graphic processing unit (GPGPU).

As illustrated in FIG. 3, the control unit 130 includes a receiving unit 131, an obtaining unit 132, a selecting unit 133, a determining unit 134, the generating unit 135, and a providing unit 136; and implements or executes the information processing functions explained below. Moreover, the control unit 130 can implement the graph generation operation explained earlier with reference to FIG. 2. Meanwhile, the control unit 130 is not limited to have the internal configuration illustrated in FIG. 3, and can have any other configuration provided the information processing explained later can be performed. For example, the generating unit 135 can perform some or all of the information processing (explained later) regarding the other constituent elements.

Receiving Unit 131

The receiving unit 131 can receive a variety of information useful in performing the operations for information retrieval. For example, the receiving unit 131 can receive object information, graph information, tree information, and parameter information from predetermined information processing apparatuses (for example, devices of entities (such as particular Internet enterprises) associated with the information processing apparatus 100). The receiving unit 131 can store the received object information in the object information storing unit 121. Moreover, the receiving unit 131 can store the received graph information (for example, the graph information of an already-generated graph) in the graph information storing unit 122. Furthermore, the receiving unit 131 can store the received tree information in the tree information storing unit 123. Moreover, the receiving unit 131 can store the received parameter information in the parameter information storing unit 124.

In at least one embodiment, the receiving unit 131 can receive "the information used in generating an index for use in a search". The information used in generating an index for use in a search is, for example, object information, graph information, and parameter information.

In an example, the receiving unit 131 receives the registration of the target data for retrieval from the information providing device 200. For example, the features (for example, the sets of vector data) are extracted from the target data for retrieval, such as still images, dynamic picture images (videos), audios, and documents. The extracted features are associated to the ID of the target data for retrieval (for example, an object ID). Herein, a plurality of IDs corresponding to a plurality of sets of target data for retrieval can be associated to a dataset ID. The receiving unit 131 receives the extracted features from the information providing device 200. Then, the receiving unit 131 stores the received features as "objects", which are expressed in the form of vectors, in the object information storing unit 121. For example, the objects (for example, the sets of vector data) associated to the IDs of the sets of target data for retrieval (for example, the object IDs) are stored in the object information storing unit 121. In this way, the sets of target data for retrieval get registered in the information processing apparatus 100. In the specific example explained earlier with reference to FIG. 1, the features registered as objects represent the image features of the fashion merchandises in online shopping.

In at least one embodiment, the receiving unit 131 can receive "the information to be used in performing the search operation using the generated index". The information to be used in performing the search operation using the generated index is, for example, tree information and parameter information.

In at least one embodiment, the receiving unit 131 can receive "a search request including a search query".

In an example, the search query included in a search request represents a "query object" expressed using a vector. In the specific example explained earlier with reference to FIG. 1, the query object is the image feature of the image of the floral informal summer kimono.

Obtaining Unit 132

The obtaining unit 132 can obtain a variety of information to be used in performing the operations for information retrieval. The obtaining unit 132 can obtain a variety of information from the memory unit 120. For example, the obtaining unit 132 can obtain object information, such as a dataset including objects corresponding to nodes, from the object information storing unit 121. Moreover, for example, the obtaining unit 132 can obtain graph information, such as an already-generated graph, from the graph information storing unit 122. Furthermore, for example, the obtaining unit 132 can obtain tree information, such as a tree-based index, from the tree information storing unit 123. Moreover, for example, the obtaining unit 132 can obtain parameter information, such as the parameters used in generating a graph, from the parameter information storing unit 124.

The obtaining unit 132 can obtain a first-type graph that includes a plurality of nodes corresponding to a plurality of search targets and includes edges that join the nodes.

In an example, the obtaining unit 132 obtains an already-generated graph. The already-generated graph can be a graph that was generated using any one of various known graph generation algorithms. As explained earlier with reference to FIG. 2, for example, the obtaining unit 132 obtains the graph G1, which is the already-generated graph, from the graph information storing unit 122.

Selecting Unit 133

The selecting unit can select the target node for processing in the virtual node addition operation. The selecting unit 133 can select the target node for processing from the already-generated graph obtained by the obtaining unit 132.

The selecting unit 133 can select, from among a plurality of nodes, the target node for performing the virtual node addition operation to add nodes that are not associated to the search target. For example, the selecting unit 133 can select, as the target node, the node for which the shortest edge from among the edges joined thereto has a greater length than a predetermined value.

In an example, the selecting unit 133 can perform a node selection operation to select the target node for processing from an already-generated graph. The selecting unit 133 selects the target node for processing from among the nodes included in the already-generated graph obtained by the obtaining unit 132.

As explained earlier with reference to FIG. 2, for example, the selecting unit 133 selects, as the target node for processing, a node that is difficult to retrieve from among the nodes in the already-generated graph. A node that is difficult to retrieve is a node separated from all other nodes. For example, a node that is difficult to retrieve is isolated from all other nodes. When the vector space of the objects has high dimensionality, the vector space sometimes leads to a situation in which a particular node becomes isolated from all other nodes.

In an example, the selecting unit 133 selects, as the target node for processing, a node that is not connected to any short edge. That is because, when a node is not connected to any short edge, that node is highly likely to be an isolated node not having any other nodes in its neighborhood. For example, from among the edges assigned to a node, when the length of the shortest edge satisfies a threshold value, the selecting unit 133 does not select that node as the target node for processing. On the other hand, from among the edges assigned to a node, when the length of the shortest edge does not satisfy the threshold value, the selecting unit 133 selects that node as the target node for processing.

In another example, the selecting unit 133 calculates the distances between all pairs of nodes in the already-generated graph. When the distance between a particular node and at least one other node satisfies a predetermined condition related to the selection of the target node for processing, the selecting unit 133 selects that particular node as the target node for processing. The predetermined condition related to the selection of the target node for processing can indicate, for example, that "from among the distances between pairs of a particular node and another node, the shortest distance does not satisfy the threshold value" (i.e., a particular node is separated from all other nodes).

In yet another example, the selecting unit 133 uses a test set meant for evaluation of the search accuracy, and identifies the nodes that got omitted from the search result. For example, a test set includes a query vector representing an instance, and a label associated to the query vector. The label represents the node that should be retrieved using the query vector. For example, the selecting unit 133 uses the already-generated graph and randomly searches for the neighboring nodes of the query vector. Then, the selecting unit 133 identifies the nodes that were not retrieved using the query vector. The selecting unit 133 selects such a node, which actually got omitted from the search result, as the target node for processing. The selecting unit 133 can generate a test set from the already-generated graph. For example, the selecting unit 133 can select arbitrary two or more nodes from among the nodes in the already-generated graph, and calculate an intermediate point of the selected arbitrary two or more nodes as the query vector. In that case, a node indicated by a label can be at least one node from among the selected arbitrary two or more nodes. Alternatively, instead of selecting arbitrary two or more nodes, the selecting unit 133 can select a plurality of nearest neighboring nodes, and calculate the intermediate point of the selected nearest neighboring nodes as the query vector. In that case, a node indicated by a label can be that single node.

Meanwhile, in the exemplary embodiment, the information processing apparatus 100 treats, as the target node for processing, a node that is difficult to retrieve from among the nodes in the already-generated graph. However, that is not the only possible case. Alternatively, the selecting unit 133 can select all nodes in the graph as the target nodes for processing. In that case, the generating unit 135 of the information processing apparatus 100 performs the virtual node addition operation regarding all nodes in the graph.

Determining Unit 134

The determining unit 134 can determine whether the nodes or the edges in the graph as obtained by the obtaining unit 132 satisfy the conditions regarding the addition of virtual nodes.

The determining unit 134 can determine whether, from among a plurality of nodes included in a first-type graph and corresponding to a plurality of search targets, at least two nodes satisfy a first predetermined condition; or can determine whether the edges joining the nodes in the first-type graph satisfy a second predetermined condition.

As explained earlier with reference to FIG. 2, for example, the determining unit 134 determines whether the length of an edge assigned to the target node for processing satisfies predetermined conditions regarding the addition of virtual nodes. For example, the predetermined conditions regarding the addition of virtual nodes can include a first condition indicating that "the length of the edge exceeds a first threshold value" and a second condition indicating that "the length of the edge exceeds a second threshold value that is greater than the first threshold value".

Generating Unit 135

The generating unit 135 can generate an index to be used in performing a search. As explained earlier with reference to FIGS. 1 and 2, the generating unit 135 can generate a graph (i.e., a neighborhood graph) as an index usable in a variety of information retrieval including similar-image retrieval. For example, the generating unit 135 can generate a neighborhood graph as a graph-type search index.

In at least one embodiment, the generating unit 135 generates, based on placement of the plurality of nodes in the first-type graph, a second-type graph that includes a virtual node representing a node not associated to a search target by adding the virtual node to the first-type graph.

In at least one embodiment, either in the case in which, from among a plurality of nodes included in a first-type graph and corresponding to a plurality of search targets, at least two nodes satisfy a first predetermined condition, or in the case in which the edges joining the nodes in the first-type graph satisfy a second predetermined condition; the generating unit 135 generates a second-type graph that includes virtual nodes, which are nodes not associated to any search target by adding the virtual in the first-type graph nodes.

In at least one embodiment, when the target node for processing in the virtual node addition operation and one other node satisfy a predetermined condition; the generating unit 135 generates a second-type graph that includes virtual nodes by adding the virtual nodes. For example, when the edge joining the target node and the other node satisfies a predetermined condition, the generating unit 135 adds virtual nodes and generates a second-type graph. For example, the generating unit 135 adds virtual nodes in between the target node and the other node in the first-type graph, and generates a second-type graph. Moreover, for example, when the edge joining the target node and the other node has the length equal to or greater than a predetermined threshold value, the generating unit 135 adds virtual node in between the target node and the other node in the first-type graph, and generates a second-type graph.

In at least one embodiment, the generating unit 135 treats, as the target node, a node for which the shortest edge from among the edges joined thereto has a greater length than a predetermined value; and generates a second-type graph.

In at least one embodiment, the generating unit 135 generates a second-type graph by adding a plurality of virtual nodes in between the target node and the other node. For example, the generating unit 135 adds virtual nodes having the count in accordance with the length of the edge joining the target node and the other node, and generates a second-type graph. Thus, for example, the generating unit 135 adds a number of virtual nodes in proportion to the length of the edge joining the target node and the other node, and generates a second-type graph.

In at least one embodiment, the generating unit 135 generates a second-type graph by deleting the edge joining the target node and the other node.

In at least one embodiment, the generating unit 135 generates a second-type graph by adding a virtual node on the edge joining the target node and the other node. For example, the generating unit 135 adds a virtual node at the midpoint of the edge joining the target node and the other node, and generates a second-type graph.

In at least one embodiment, the generating unit 135 adds, in the second-type graph, an edge joining a virtual node to a neighboring node that, from among the nodes included in the second-type graph, is positioned in the neighborhood of that virtual node.

As explained earlier with reference to FIG. 2, the generating unit 135 can perform the virtual node addition operation for adding virtual nodes in the already-generated graph obtained by the obtaining unit 132. After the target node for processing is selected, the generating unit 135 can add virtual nodes in the already-generated graph in such a way that the target node for processing (i.e., the node that tends to get omitted from the search result) becomes easily retrievable.

The generating unit 135 can generate a new object (for example, a set of vector data) as a virtual node, and can add the virtual node in the already-generated graph. Hence, adding a virtual node can include generating a new object expressed using vector data. In some implementations, the generating unit 135 can add a virtual node in the already-generated graph and generate an intermediate state graph. As a result of adding a virtual node in a graph, the generating unit 135 becomes able to prevent omissions from the search, thereby enabling achieving improvement in the search accuracy of the graph.

In the case of adding virtual nodes, in order to distinguish between real nodes (i.e., the nodes associated to the registered target data for retrieval) and virtual nodes (i.e., the nodes "not" associated to the registered target data for retrieval), the generating unit 135 assigns a flag to the added virtual nodes. For example, the generating unit 135 assigns the real-node flag "0" to the virtual nodes. Moreover, the generating unit 135 can assign the real-node flag "1" to the real nodes.

In some embodiments, based on "the distance between the target node for processing and the other node", the generating unit 135 can add virtual nodes. For example, based on the distance between the target node for processing and a neighboring node to the target node for processing, the generating unit 135 can add virtual nodes around the target node for processing.

As explained earlier with reference to FIG. 2, for example, based on "the length of an edge assigned to the target node for processing", the generating unit 135 adds virtual nodes. For example, for each target node for processing as selected by the selecting unit 133, the generating unit 135 generates, as virtual nodes, objects having the count in accordance with the length of an edge assigned to the target node for processing. The generated virtual nodes can be placed equidistantly on the edge assigned to the target node for processing. Alternatively, the generated virtual nodes can be placed more toward the target node for processing. Herein, longer the edge assigned to the target node for processing, the greater can be the number of virtual nodes placed on that edge.

As explained earlier with reference to FIG. 2, for example, when the determining unit 134 determines that the length of an edge assigned to the target node for processing satisfies predetermined conditions regarding the addition of virtual nodes; the generating unit 135 adds virtual nodes. For example, when the determining unit 134 determines that the length of the edge satisfies a first condition, the generating unit 135 can add a single virtual node. When the determining unit 134 determines that the length of the edge satisfies a second condition, the generating unit 135 can add two virtual nodes. The generating unit 135 can calculate the number of virtual nodes by dividing "the length of the edge before assigning virtual nodes" by "the maximum length of the edge after assigning virtual nodes".

The generating unit 135 can decide on the number of nodes to be added based on the distribution of the distances between pairs of nodes in the already-generated graph. For example, the generating unit 135 can calculate the distances between all pairs of nodes in the already-generated graph and generate a distance distribution for the nodes in the graph. Then, based on the generated distance distribution for the nodes, the generating unit 135 can decide on the number of virtual nodes to be added. For example, with reference to the average distance between arbitrary two nodes, the determining unit 134 can accordingly decide on the number of virtual nodes to be added. As explained earlier with reference to FIG. 2, for example, if the distance between the target node for processing and another node exceeds the average distance, then the generating unit 135 can decide on the value "2" as the number of virtual nodes to be added. On the other hand, if the distance between the target node for processing and the other node is shorter than the average distance, then the generating unit 135 can decide on the value "1" as the number of virtual nodes to be added. Alternatively, the generating unit 135 can calculate the number of virtual nodes by dividing "the length of the edge before assigning virtual nodes" by "the average distance".

As explained earlier with reference to FIG. 2, the generating unit 135 can perform an edge assignment operation for assigning edges to the virtual nodes. After adding a virtual node, the generating unit 135 connects the virtual node and the neighboring nodes of the virtual node by edges, and generates a new graph. In an identical manner to the case of the real nodes, the generating unit 135 can implement various known graph generation algorithms (for example, the ANNG index generation algorithm), and connect the virtual node to the neighboring nodes thereof by edges. As a result, the generating unit 135 can generate a new graph from the intermediate state graph.

Regarding the ANNG index generation algorithm, in an example, the generating unit 135 gradually adds new objects, which correspond to the virtual nodes, as the target objects for search in the already-generated graph. In other words, the generating unit 135 sequentially registers virtual nodes in the already-generated graph. For example, the generating unit 135 obtains a new object, which corresponds to the target virtual node for processing, from the database. Then, the generating unit 135 performs a node search using the partially-generated ANNG and searches for the neighboring nodes of the concerned virtual node. As a result, the generating unit 135 becomes able to connect the retrieved neighboring nodes to the virtual node by edges. Meanwhile, the generating unit 135 can delete the original edges on which the virtual nodes are placed.

The generating unit 135 can use various known graph generation algorithms (i.e., algorithms for building an index) and generate a graph from a dataset including sets of vector data. Examples of various known graph generation algorithms include the ANNG index generation algorithm and the ONNG index generation algorithm (for example, refer to (M. Iwasaki and D. Miyazaki, "Optimization of Indexing Based on k-Nearest Neighbor graph for Proximity", arXiv: cs.DB/1810.07355). Meanwhile, "using a graph generation algorithm and generating a graph from a dataset including sets of vector data" includes "generating an index of the provided vector data".

In some implementations, the generating unit 135 can use various known graph generation algorithms mentioned above and generate a graph without virtual nodes from a dataset including sets of vector data. In that case, a set of vector data represents a registered object. An example of a graph without virtual nodes is the graph G1 explained earlier with reference to FIG. 2.

In some implementations, the generating unit 135 can use various known graph generation algorithms mentioned above and generate a graph including virtual nodes from a dataset including sets of vector data. In that case, a set of vector data can represent the target object for retrieval or a virtual node. That is, regardless of whether or not the sets of vector data represent the target objects for retrieval, the generating unit 135 can generate an index of the graph of the provided sets of vector data. In other words, without distinguishing between the real nodes and the virtual nodes, the generating unit 135 can add the sets of vector data as nodes in the vector space and assign edges to the added nodes. In this way, as a result of using various known graph generation algorithms, the generating unit 135 can assign edges to the virtual nodes present in the space of the objects.

As far as assigning the edges is concerned, when a dataset including the target objects for retrieval and the virtual nodes is provided, for example, the generating unit 135 can add one set of vector data of the dataset at a time in a random manner as a real node or a virtual node in the vector space. Moreover, the generating unit 135 can perform the k-nearest neighbor search using the index available midway in the generation of the graph. For example, the generating unit 135 can connect the retrieved k number of neighboring nodes and the added nodes by edges. Then, by repeating the steps including the k-nearest neighbor search and the assignment of edges, the generating unit 135 can generate a graph (for example, an ANNG index mentioned earlier).

As far as the addition of nodes is concerned, the generating unit 135 can use the index of an already-generated graph (i.e., an already-generated index) and perform the k-nearest neighbor search. Then, the generating unit 135 can connect the retrieved k number of neighboring nodes and the added virtual nodes by edges. However, the generating unit 135 need not use an already-generated graph. In that case, the generating unit 135 can add one set of vector data of the dataset at a time in a random manner as a real node or a virtual node in the vector space not having nodes. Then, the generating unit 135 can perform the k-nearest neighbor search using the index available midway in the generation of a new graph.

In some implementations, the generating unit 135 can store the sets of vector data, which represent the added virtual nodes, in the object information storing unit 121. For example, the generating unit 135 can store the added virtual nodes as new objects in the object information storing unit 121. That is, the generating unit 135 can register the virtual nodes, which are not associated to the registered objects, as new objects.

The generating unit 135 can obtain an already-generated graph (i.e., an already-generated index) from the graph information storing unit 122. Moreover, the generating unit 135 can obtain the sets of vector data, which represent the added virtual nodes, as objects from the object information storing unit 121. Then, the generating unit 135 can add the obtained objects, one by one in a random manner, in the vector space of the already-generated graph. As explained above, the generating unit 135 can perform the k-nearest neighbor search using the index available midway in the generation of a graph. In that case, the generating unit 135 can connect the retrieved k number of neighboring nodes and the objects by edges. In this way, the generating unit 135 can generate the graph G2 explained earlier with reference to FIG. 2. Thus, when a virtual node is added as a new set of vector data in the index of an already-generated graph, the generating unit 135 can use various known graph generation algorithms and generate the index of a new graph including that virtual node.

In some implementations, based on adjustment parameters that are used in adjusting the number of input-output edges, the generating unit 135 can adjust the edges assigned to the nodes in the graph. For example, the generating unit 135 obtains an already-generated graph (i.e., an already-generated index) from the graph information storing unit 122. Moreover, the generating unit 135 obtains the adjustment parameters from the parameter information storing unit 124. Then, based on the obtained adjustment parameters, the generating unit 135 can generate a graph in which the number of input edges and the number of output edges are adjusted (for example, can generate an ONNG index explained earlier).

Providing Unit 136

The providing unit 136 can perform a search operation using the index generated by the generating unit 135. Moreover, the providing unit 136 can provide the search result to other devices. For example, in response to receiving search requests for a variety of information from the information providing device 200, the providing unit 136 can search for a variety of information using the graph generated by the generating unit 135. Then, the providing unit 136 can provide the search result to the information providing device 200.

In the specific example explained earlier with reference to FIG. 1, in response to a search query received from the information providing device 200, the providing unit 136 searches the index for the fashion merchandise search in which the fashion merchandises in online shopping are expressed using the image features. In this example, a variety of information represents the merchandise information of "the informal summer kimonos similar to the floral informal summer kimono captured in the query image". The search result is, for example, a merchandise ID associated to "the informal summer kimonos similar to the floral informal summer kimono captured in the query image".

In an example, in response to receiving a query object from the information providing device 200, the providing unit 136 searches for the closest object to the query object from among the registered objects. The distance between two objects is expressed as a distance function. Examples of the distance function include the L1 distance, the Euclidean distance (i.e., the L2 distance), the cosine similarity, and the angle (i.e., the inverse trigonometric function of the cosine similarity). As explained earlier with reference to FIG. 2, generally, shorter the distance between two objects, the higher is the similarity between them.

Meanwhile, apart from the Euclidean distance and the cosine similarity, the distance function can represent various other metrics. A metric defines the manner of calculating the distance between two sets of vector data. When the vector data is in the form of binary data, the distance function can represent a metric such as the Hamming distance.

In an example, the providing unit 136 can use the graph generated by the generating unit 135 and approximatively search for the closest object to the query object. For example, when the receiving unit 131 receives a query object, the providing unit 136 follows the nodes in the graph and searches for the neighboring nodes of the query object.

Regarding an example of graph exploration, firstly, the providing unit 136 can select the search start point. The providing unit 136 can select the search start point using the tree-based index stored in the tree information storing unit 123. The search start point can be an arbitrary node. Meanwhile, the providing unit 136 can select an arbitrary node as the search start point without using the tree-based index. Then, the providing unit 136 can move the search point to the closest node to the query object from among the nodes that are connected to the node at the search start point by edges. In this way, the providing unit 136 can greedily move the search point toward the query object. As a result of moving the search point in a repeated manner, the providing unit 136 can retrieve the neighboring nodes of the query object.

Since the virtual nodes have the real-node flag assigned thereto, the providing unit 136 can trace a graph including virtual nodes while ensuring that the virtual nodes are not included in the search result. The providing unit 136 can use various known search algorithms (for example, the k-nearest neighbor search) and search for the neighboring nodes of the query object. In the case of exploring a graph that includes virtual nodes, the providing unit 136 can determine whether a node is a real node based on the real-node flag assigned to the node. If a node is a virtual node, then the providing unit 136 can exclude that node from the search result.

The providing unit 136 can explore a graph using various known search algorithms (for example, the k-nearest neighbor search). The providing unit 136 can obtain a graph (i.e., an index) from the graph information storing unit 122. In the case of exploring a graph that includes virtual nodes; the providing unit 136 determines whether a node is a real node, based on the real-node flag assigned to the nodes. When a node is a virtual node, the providing unit 136 excludes that node from the search result. Regarding a search operation performed using graph data that contains virtual nodes, the detailed explanation is given below with reference to FIG. 8.

4. Flow of Graph Generation Operation

Figure 6:
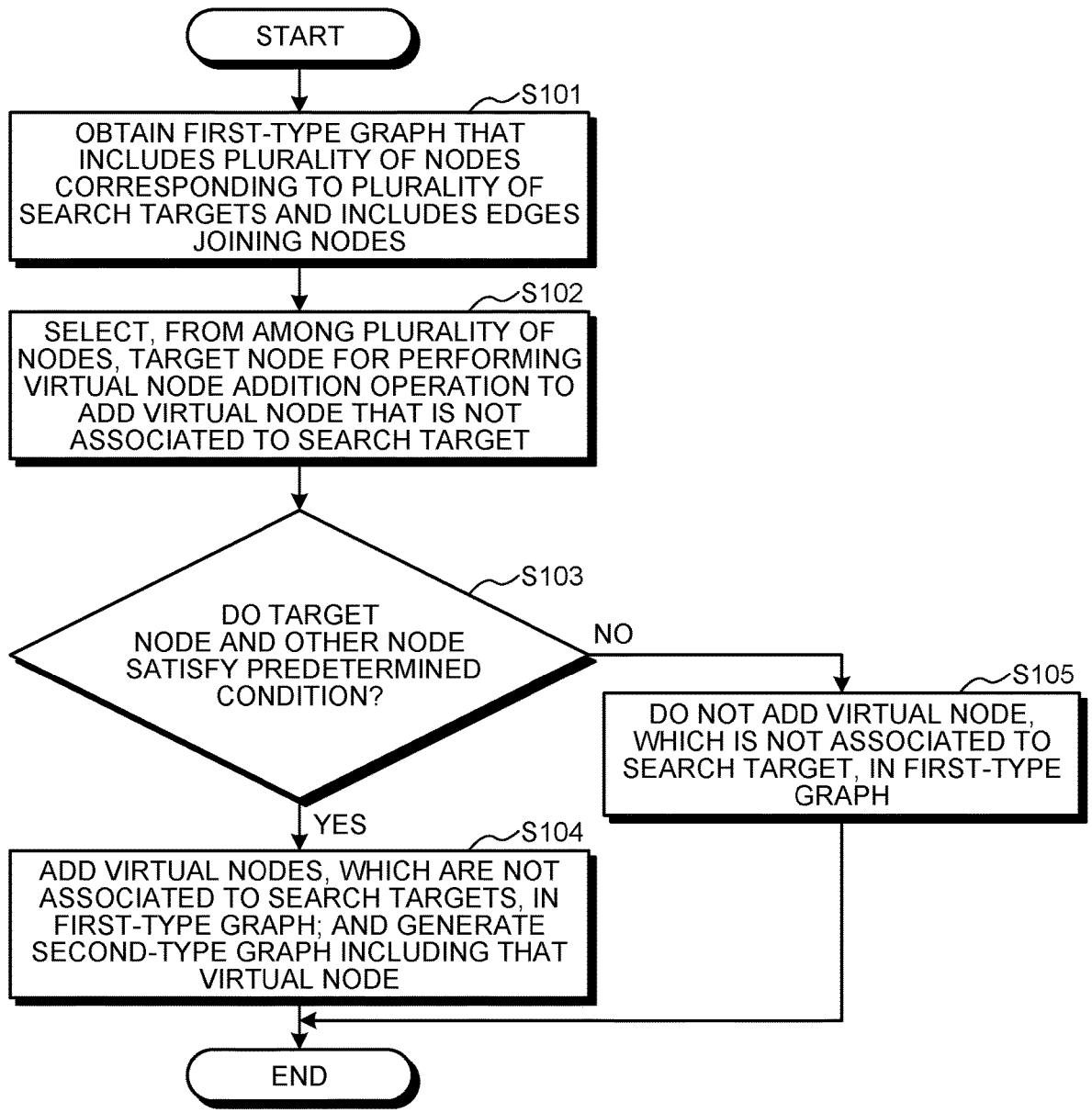
FIG. 6 is a flowchart for explaining the sequence of operations performed by the information processing apparatus according to the embodiment in order to generate a graph that includes virtual nodes.

Explained below with reference to FIG. 6 is a sequence of operations in the graph generation operation performed in the information processing apparatus 100 (for example, the generating unit 135) according to the embodiment.

FIG. 6 is a flowchart for explaining the sequence of operations performed by the information processing apparatus 100 according to the embodiment in order to generate a graph.

As illustrated in FIG. 6, firstly, the obtaining unit 132 of the information processing apparatus 100 obtains a first-type graph that includes a plurality of nodes corresponding to a plurality of search targets and includes edges joining the nodes (Step S101).

Then, the selecting unit 133 of the information processing apparatus 100 selects, from among a plurality of nodes, the target node for performing the virtual node addition operation to add a virtual node that is not associated to the search target (Step S102). For example, the selecting unit 133 can select, as the target node, the node for which the shortest edge from among the edges joined thereto has a greater length than a predetermined value.

Then, the determining unit 134 of the information processing apparatus 100 determines whether the target node, which is selected by the selecting unit 133, and another node satisfy a predetermined condition (Step S103). As an example, the predetermined condition can indicate that "the length of the edge joining the target node and the other node exceeds a threshold value". As another example, the predetermined condition can indicate that "the distance between the target node and the other node exceeds a threshold value".

If the determining unit 134 determines that the distance between the target node, which is selected by the selecting unit 133, and the other node satisfies the predetermined condition (Yes at Step S103), then the generating unit 135 of the information processing apparatus 100 adds virtual nodes, which are not associated to the search target, in the first-type graph; and generates a second-type graph including that virtual node (Step S104). On the other hand, if the determining unit 134 determines that the distance between the target node, which is selected by the selecting unit 134, and the other node does not satisfy the predetermined condition (No at Step S103), then the generating unit 135 does not add a virtual node, which are not associated to the search target, in the first-type graph (Step S105).

Meanwhile, the information processing apparatus 100 can perform the operation at Step S103 with respect to all target nodes that are selected. For example, if the information processing apparatus 100 selects a plurality of target nodes at Step S102; then, until the operation at Step S103 is performed with respect to all target nodes, the information processing apparatus 100 can repeat the operation at Step S103 with respect to each target node, and then can repeat the operation at Step S104 or the operation at Step S105 for each target node. In this way, the information processing apparatus 100 can repeat the operation at Step S103 so as to generate a new graph that includes virtual nodes added for each target node.

In some implementations, the information processing apparatus 100 can repeat the operations at Steps S102 and S103 at arbitrary points of time. For example, at Step S102, if a single target node is selected, then the information processing apparatus 100 can perform the operation at Step S103 with respect to that single target node. After the operation at Step S103 is performed with respect to that single target node, the information processing apparatus 100 can newly select another target node and then perform the operation at Step S103 with respect to the newly-selected target node.

5. Flow of Node Search Operation

Figure 7:
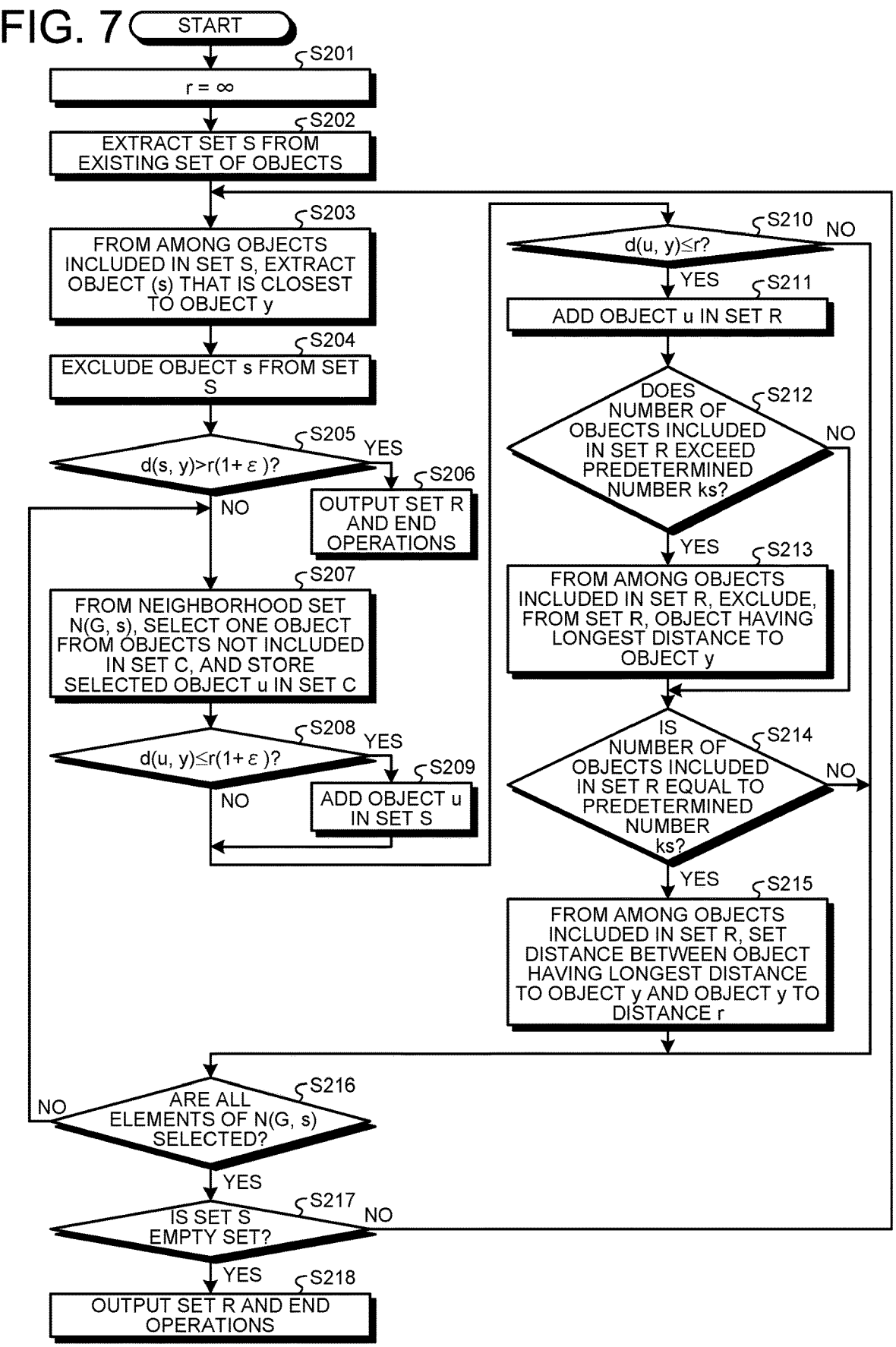
FIG. 7 is a flowchart for explaining the sequence of operations performed by the information processing apparatus according to the embodiment in order to search for nodes using a graph.

Explained below with reference to FIG. 7 is the sequence of operations in a node search operation performed by the information processing apparatus 100 (for example, the generating unit 135) according to the embodiment.

FIG. 7 is a flowchart for explaining the sequence of operations performed by the information processing apparatus 100 according to the embodiment in order to search for nodes using a graph. More particularly, FIG. 7 is a flowchart for explaining an example of the node search operation performed using graph data. In the following explanation, an object can be referred to as a node too. Meanwhile, the node search using graph data as performed by the information processing apparatus 100 is not limited to the following sequence of operations, and various alternative sequences of operations can be followed.

Herein, a neighborhood set (G, y) represents the set of neighboring objects that are associated by the edges assigned to a node y. For example, the neighborhood set (G, y) represents the set of objects (nodes) that are joined to the node y by edges. When the nodes in a graph are joined by directed edges, the neighborhood set (G, y) represents the set of objects (nodes) to which the output edges from the node y are joined. Herein, "G" can represent predetermined graph data (for example, a graph G1 or a graph G2). For example, the information processing apparatus 100 performs the k-nearest neighbor search operation.

For example, the information processing apparatus 100 sets a radius r of a hypersphere to ∞ (infinity) (Step S201), and extracts a set S from the existing set of objects (Step S202). For example, the information processing apparatus 100 can extract, as the set S, the object (node) decided (selected) as the start node. Meanwhile, a hypersphere is, for example, a virtual sphere indicating the search range. The object (node) included in the set S, which is extracted at Step S202, can also be included in the initial set of a set R of search results (extraction candidates). Moreover, the object (node) included in the set S, which is extracted at Step S202, can also be included in a set C. The set C is provided as a matter of convenience for avoiding duplicate retrieval, and can be set to an empty set at the start of the operations.

Then, the information processing apparatus 100 extracts, from among the objects included in the set S, the object that, when "y" represents the search query object, has the shortest distance to the object y; and then sets the extracted object as an object s (Step S203). As explained earlier with reference to FIGS. 2 and 3, for example, the search query object is an object corresponding to an added virtual node. Subsequently, the information processing apparatus 100 excludes the object s from the set S (Step S204).

Then, the information processing apparatus 100 determines whether or not a distance d(s, y) between the objects s and y exceeds r(1+ε) (Step S205). Herein, c represents an expansion element, and r(1+ε) represents the radius of the exploration range (the exploration is performed only for the nodes within that exploration range; and the accuracy can be enhanced by setting a greater exploration range than the search range). If the distance d(s, y) between the objects s and y exceeds r(1+ε) (Yes at Step S205), then the information processing apparatus 100 outputs the set R as the neighborhood set of the object y (Step S206). That marks the end of the operations. As explained earlier with reference to FIGS. 2 and 3, for example, the neighborhood set is the set of neighboring nodes of the concerned virtual node.

On the other hand, if the distance d(s, y) between the objects s and y does not exceed r(1+ε) (No at Step S205); then, based on a predetermined criterion, the information processing apparatus 100 selects an object from the objects that, from among the objects representing the elements of a neighborhood set N(G, s) of the object s, are not included in the set C; and stores the selected object u in the set C (Step S207).

Subsequently, the information processing apparatus 100 determines whether or not a distance d(u, y) between the objects u and y is equal to or shorter than r(1+ε) (Step S208). If the distance d(u, y) between the objects u and y is equal to or shorter than r(1+ε) (Yes at Step S208), then the information processing apparatus 100 adds the object u in the set S (Step S209). On the other hand, if the distance d(u, y) between the objects u and y is not equal to or shorter than r(1+ε) (No at Step S208), then the information processing apparatus 100 performs the determination (operation) at Step S210.

Then, the information processing apparatus 100 determines whether or not the distance d(u, y) between the objects u and y is equal to or shorter than r (Step S210). If the distance d(u, y) between the objects u and y exceeds r, then the information processing apparatus 100 performs the determination (operation) at Step S217. Thus, if the distance d(u, y) between the objects u and y is not equal to or shorter than r (No at Step S210), then the system control performs the determination (operation) at Step S216.

When the distance d(u, y) between the objects u and y is equal to or shorter than r (Yes at Step S210), the information processing apparatus 100 adds the object u in the set R (Step S211). Then, the information processing apparatus 100 determines whether the number of objects included in the set R exceeds the predetermined number ks (Step S212). Herein, the predetermined number ks is a natural number set in an arbitrary manner. For example, the predetermined number ks represents the extraction count in a search, and can be set to an arbitrary value such as "3", or "20", or "100". If the number of objects included in the set R does not exceed the predetermined number ks (No at Step S212), then the information processing apparatus 100 performs the determination (operation) at Step S214.

On the other hand, if the number of objects included in the set R exceeds the predetermined number ks (Yes at Step S212), then the information processing apparatus 100 excludes, from the set R, the object having the longest distance to the object y (i.e., the object farthest from the object y) from among the objects included in the set R (Step S213).

Subsequently, the information processing apparatus 100 determines whether or not the number of objects included in the set R is equal to the predetermined number ks (Step S214). If the number of objects included in the set R is not equal to the predetermined number ks (No at Step S214), then the information processing apparatus 100 performs the determination (operation) at Step S216. On the other hand, if the number of objects included in the set R is equal to the predetermined number ks (Yes at Step S214), then the information processing apparatus 100 sets the distance between the object having the longest distance to the object y (i.e., the object farthest from the object y), from among the objects included in the set R, and the object y to a new "r" (Step S215).

Then, the information processing apparatus 100 determines whether or not all objects representing the elements of the neighborhood set N(G, s) of the object s have been selected (Step S216). If all objects representing the elements of the neighborhood set N(G, s) of the object s have not been selected (No at Step S216), then the system control returns to Step S207 and the information processing apparatus 100 again performs the subsequent operations. Meanwhile, instead of having the only case of selecting all objects representing the elements of the neighborhood set N(G, s) of the object s, the information processing apparatus 100 can alternatively set a predetermined threshold value and select the objects equal in number to the threshold value.

If all objects representing the elements of the neighborhood set N(G, s) of the object s have been selected (Yes at Step S216), then the information processing apparatus 100 determines whether or not the set S is an empty set (Step S217). If the set S is not an empty set (No at Step S217), then the system control returns to Step S203 and the information processing apparatus 100 again performs the subsequent operations. On the other hand, if the set S is an empty set (Yes at Step S217), then the information processing apparatus 100 outputs the set R (Step S218). That marks the end of the operations. For example, the information processing apparatus 100 can select, as the neighboring objects of the target node (the input object y), the objects (nodes) included in the object set R. For example, the information processing apparatus 100 can provide the user device 10, which performed the search, with the objects (nodes) included in the object set R as the search result corresponding to the search query (the input object y).

6. Flow of Real-Node Search Operation

Figure 8:
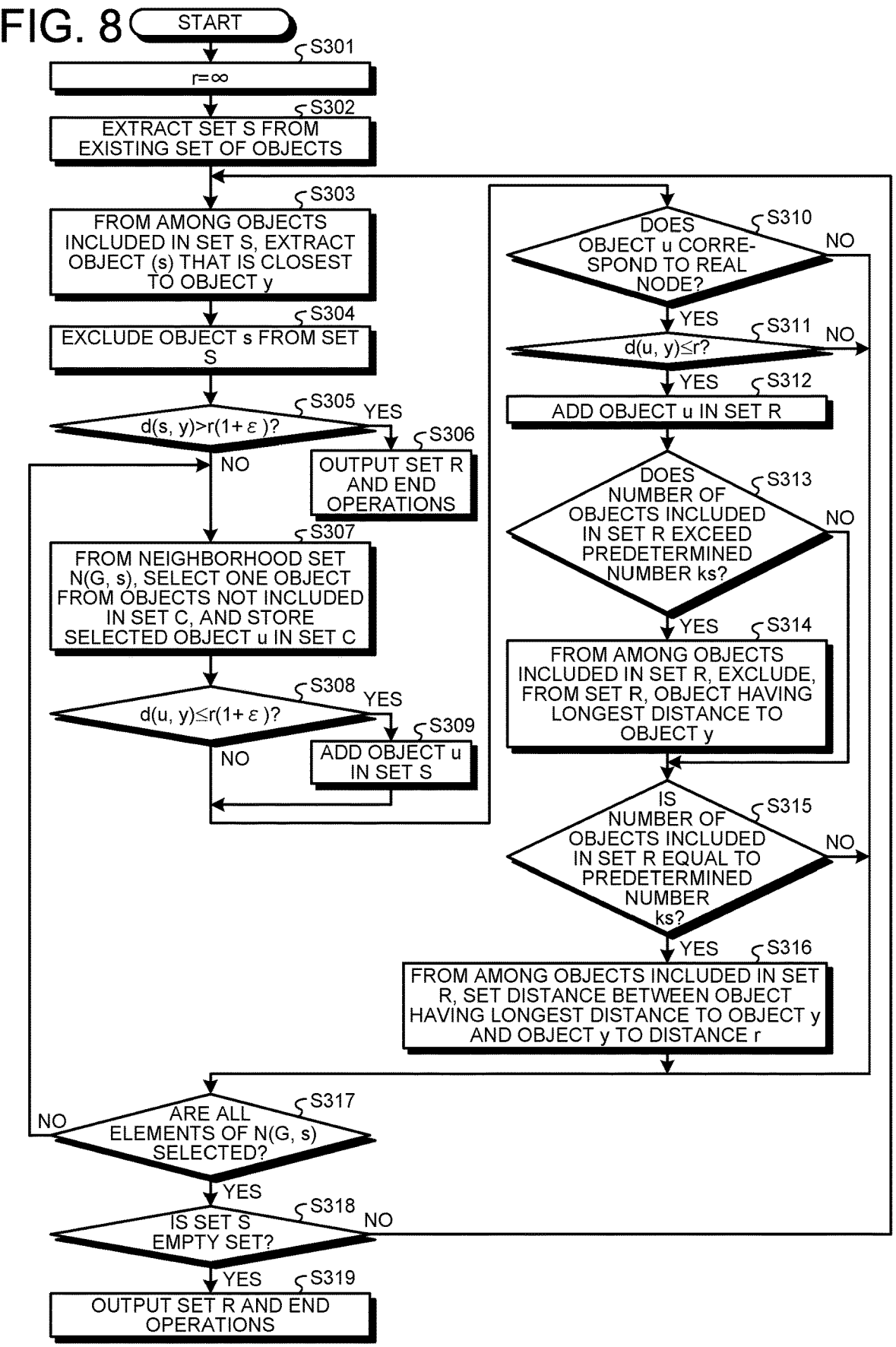
FIG. 8 is a flowchart for explaining the sequence of operations performed by the information processing apparatus according to the embodiment in order to search for real nodes using a graph that includes virtual nodes.

Explained below with reference to FIG. 8 is the sequence of operations in a real-node search operation performed by the information processing apparatus 100 (for example, the providing unit 136) according to the embodiment.

FIG. 8 is a flowchart for explaining the sequence of operations performed by the information processing apparatus 100 according to the embodiment in order to search for real nodes using a graph that includes virtual nodes. More particularly, FIG. 8 is a flowchart for explaining an example of the real-node search operation performed using graph data that contains virtual nodes. In the following explanation, an object can be referred to as a node too. Meanwhile, the search for real nodes using graph data containing virtual nodes as performed by the information processing apparatus 100 is not limited to the following sequence of operations, and various alternative sequences of operations can be followed.

Herein, the neighborhood set (G, y) represents the set of neighboring objects that are associated by the edges assigned to the node y. For example, the neighborhood set (G, y) represents the set of objects (nodes) that are joined to the node y by edges. When the nodes in a graph are joined by directed edges, the neighborhood set (G, y) represents the set of objects (nodes) to which the output edges from the node y are joined. Herein, "G" can represent predetermined graph data (for example, the graph G1 or the graph G2). For example, the information processing apparatus 100 performs the k-nearest neighbor search operation.

For example, the information processing apparatus 100 sets the radius r of a hypersphere to ∞ (infinity) (Step S301), and extracts the set S from the existing set of objects (Step S302). For example, the information processing apparatus 100 can extract, as the set S, the object (node) decided (selected) as the start node. Meanwhile, a hypersphere is, for example, a virtual sphere indicating the search range. The object (node) included in the set S, which is extracted at Step S302, can also be included in the initial set of the set R of search results (extraction candidates). Moreover, the object (node) included in the set S, which is extracted at Step S302, can also be included in the set C. The set C is provided as a matter of convenience for avoiding duplicate retrieval, and can be set to an empty set at the start of the operations.

Then, the information processing apparatus 100 extracts, from among the objects included in the set S, the object that, when "y" represents the search query object, has the shortest distance to the object y; and sets the extracted object as the object s (Step S303). In the specific example explained earlier with reference to FIG. 1, the search query object represents the image feature of the image in which a floral informal summer kimono is captured. Subsequently, the information processing apparatus 100 excludes the object s from the set S (Step S304).

Then, the information processing apparatus 100 determines whether or not the distance d(s, y) between the objects s and y exceeds r(1+ε) (Step S305). Herein, ε represents an expansion element, and r(1+ε) represents the radius of the exploration range (the exploration is performed only for the nodes within that exploration range; and the accuracy can be enhanced by setting a greater exploration range than the search range). If the distance d(s, y) between the objects s and y exceeds r(1+ε) (Yes at Step S305), then the information processing apparatus 100 outputs the set R as the neighborhood set of the object y (Step S306). That marks the end of the operations. In the specific example explained earlier with reference to FIG. 1, the neighborhood set represents the set of nodes corresponding to the fashion merchandises that have a similar appearance to the floral informal summer kimono captured in the concerned image.

On the other hand, if the distance d(s, y) between the objects s and y does not exceed r(1+ε) (No at Step S305); then, based on a predetermined criterion, the information processing apparatus 100 selects an object from the objects that, from among the objects representing the elements of a neighborhood set N(G, s) of the object s, are not included in the set C; and stores the selected object u in the set C (Step S307).

Subsequently, the information processing apparatus 100 determines whether or not the distance d(u, y) between the objects u and y is equal to or shorter than r(1+ε) (Step S308).

If the distance d(u, y) between the objects u and y is equal to or shorter than r(1+ε) (Yes at Step S308), then the information processing apparatus 100 adds the object u in the set S (Step S309). On the other hand, if the distance d(u, y) between the objects u and y is not equal to or shorter than r(1+ε) (No at Step S308), then the information processing apparatus 100 performs the determination (operation) at Step S310.

Then, the information processing apparatus 100 determines whether or not the object u is a real node (i.e., whether or not the object u is not a virtual node) (Step S310). If the object u is not a real node (No at Step S310), then the information processing apparatus performs the determination (operation) at Step S317.

On the other hand, if the object u is a real node (Yes at Step S310), then the information processing apparatus 100 determines whether or not the distance (u, y) between the objects u and y is equal to or shorter than r (Step S311). If the distance d(u, y) between the objects u and y exceeds r, then the information processing apparatus 100 performs the determination (operation) at Step S317. Thus, if the distance d(u, y) between the objects u and y is not equal to or shorter than r (No at Step S311), then the system control performs the determination (operation) at Step S317.

When the distance d(u, y) between the objects u and y is equal to or shorter than r (Yes at Step S311), the information processing apparatus 100 adds the object u in the set R (Step S312). Then, the information processing apparatus 100 determines whether the number of objects included in the set R exceeds the predetermined number ks (Step S313). Herein, the predetermined number ks is a natural number set in an arbitrary manner. For example, the predetermined number ks represents the extraction count in a search, and can be set to an arbitrary value such as "3", or "20", or "100". If the number of objects included in the set R does not exceed the predetermined number ks (No at Step S313), then the information processing apparatus 100 performs the determination (operation) at Step S315.

On the other hand, if the number of objects included in the set R exceeds the predetermined number ks (Yes at Step S313), then the information processing apparatus 100 excludes, from the set R, the object having the longest distance to the object y (i.e., the object farthest from the object y) from among the objects included in the set R (Step S314).

Subsequently, the information processing apparatus 100 determines whether or not the number of objects included in the set R is equal to the predetermined number ks (Step S315). If the number of objects included in the set R is not equal to the predetermined number ks (No at Step S315), then the information processing apparatus 100 performs the determination (operation) at Step S317. On the other hand, if the number of objects included in the set R is equal to the predetermined number ks (Yes at Step S315), then the information processing apparatus 100 sets the distance between the object having the longest distance to the object y (i.e., the object farthest from the object y), from among the objects included in the set R, and the object y to a new "r" (Step S316).

Then, the information processing apparatus 100 determines whether or not all objects representing the elements of the neighborhood set N(G, s) of the object s have been selected (Step S317). If all objects representing the elements of the neighborhood set N(G, s) of the object s have not been selected (No at Step S317), then the system control returns to Step S307 and the information processing apparatus 100 again performs the subsequent operations. Meanwhile, instead of having the only case of selecting all objects representing the elements of the neighborhood set N(G, s) of the object s, the information processing apparatus 100 can alternatively set a predetermined threshold value and select the objects equal in number to the threshold value.

If all objects representing the elements of the neighborhood set N(G, s) of the object s have been selected (Yes at Step S317), then the information processing apparatus 100 determines whether or not the set S is an empty set (Step S318). If the set S is not an empty set (No at Step S318), then the system control returns to Step S303 and the information processing apparatus 100 again performs the subsequent operations. On the other hand, if the set S is an empty set (Yes at Step S318), then the information processing apparatus 100 outputs the set R (Step S319). That marks the end of the operations. For example, the information processing apparatus 100 can select, as the neighboring objects of the target node (the input object y), the objects (nodes) included in the object set R. For example, the information processing apparatus 100 can provide the user device 10, which performed the search, with the objects (nodes) included in the object set R as the search result corresponding to the search query (the input object y).

7. Other Embodiments

The information processing apparatus 100 according to the embodiment described above can be implemented in various other illustrative embodiments different than the embodiment described above. Given below is the explanation of other embodiments of the information processing apparatus 100.

7-1. Addition of Virtual Nodes Based on Inter-Edge Angle

In some embodiments, if the edge joining the target node to another node and an edge on which other virtual nodes are already placed make an angle exceeding a predetermined value; information processing apparatus 100 can generate a second-type graph by adding virtual nodes on the edge that joins the target node to the other node.

Figure 9:
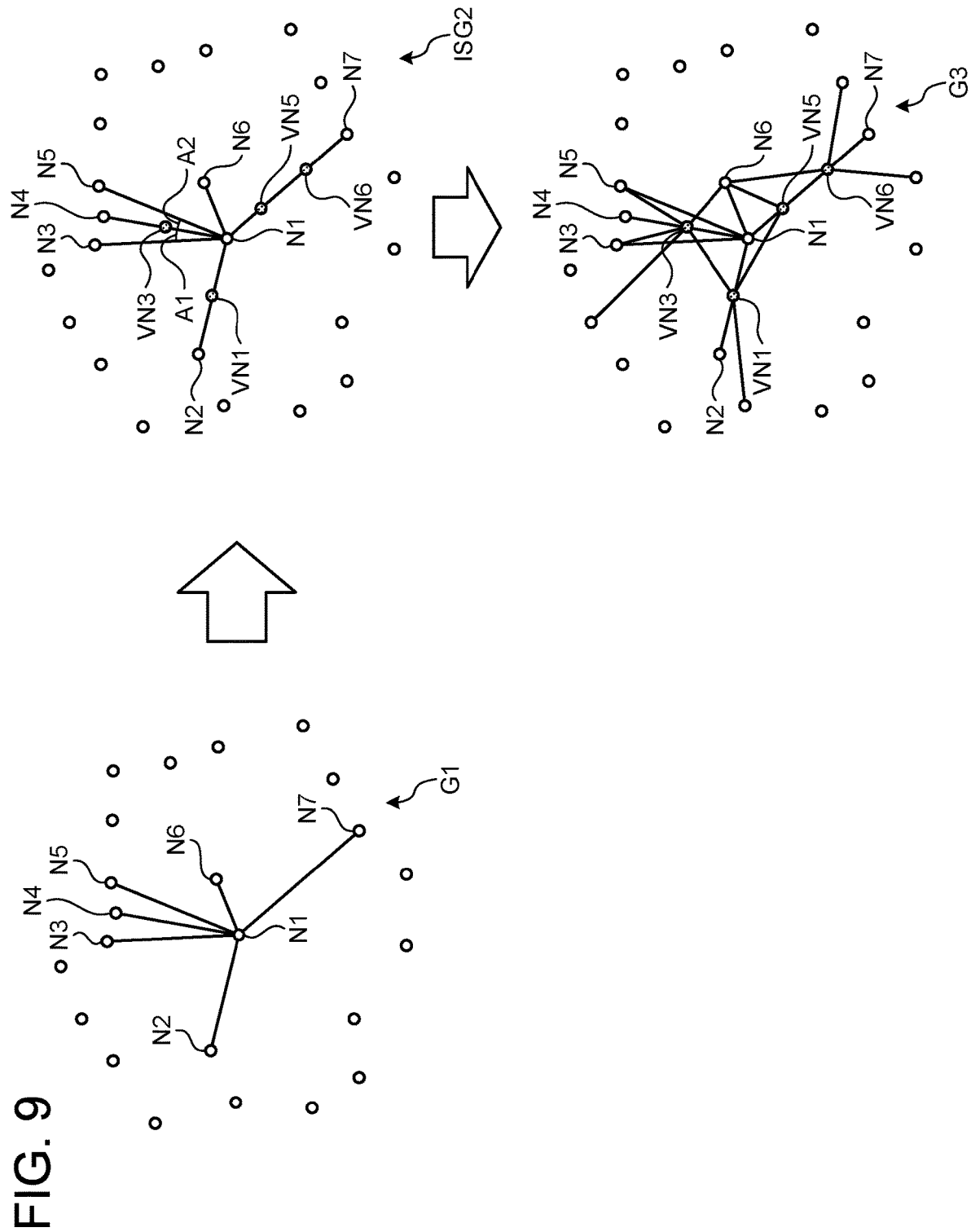
FIGS. 9 to 11 are diagrams illustrating examples of the graph generation operation performed for generating a graph.

FIG. 9 is a diagram illustrating an example of the graph generation operation performed for generating a graph. In an identical manner to the exemplary embodiment described above, the graph generation operation includes the following three steps: 1) selection of the target node for processing from an already-generated graph; 2) addition of virtual nodes in the already-generated graph; and 3) assignment of edges to the virtual nodes. The first step, the second step, and the third step respectively correspond to the initial state, the intermediate state, and the final state of the graph. In the example illustrated in FIG. 9, a new graph G3 is generated from the already-generated graph G1 via an intermediate state graph ISG2. In FIG. 9, a "white arrow" indicates that the graph generation operation proceeds to the next step.

In some implementations, the information processing apparatus 100 can add a virtual node based on "the inter-edge angle". The following explanation is given about various implementation forms of "addition of virtual nodes based on the inter-edge angle".

In an identical manner to the exemplary embodiment described above, firstly, the obtaining unit 132 of the information processing apparatus 100 obtains an already-generated graph. In the example illustrated in FIG. 9, the obtaining unit 132 obtains the graph G1 from the graph information storing unit 122. Then, the selecting unit 133 of the information processing apparatus 100 selects the target node for processing from among the nodes in the already-generated graph. In the example illustrated in FIG. 9, the selecting unit 133 selects the node N1 as the target node for processing.

Then, the determining unit 134 of the information processing apparatus 100 determines whether the target node, which is selected by the selecting unit 133, and another node satisfy a predetermined condition regarding addition of virtual nodes. If the determining unit 134 determines that the target node and the other node satisfy the predetermined condition regarding addition of virtual nodes, the generating unit 135 of the information processing apparatus 100 adds virtual nodes in the already-generated graph and generates an intermediate state graph.

The determining unit 134 generates the intermediate state graph in such a way that the directions of the added virtual nodes are reflected therein. The generating unit 135 places a first virtual node on a first edge assigned to the target node for processing. Then, in order to ensure that the direction of the added virtual node is not biased in any particular direction, the determining unit 134 calculates the angle between the first edge on which the virtual node is placed and another edge assigned to the target node for processing. Then, the determining unit 134 determines whether the calculated angle satisfies a predetermined condition regarding addition of virtual nodes. For example, the predetermined condition regarding addition of virtual nodes can indicate that "the calculated angle exceeds a threshold value". If the determining unit 134 determines that the calculated angle satisfies the predetermined condition regarding addition of virtual nodes, then the generating unit 135 places a second virtual node on the other edge.

If the first edge on which the first virtual node is placed and the second edge on which the second virtual node is placed make only a small angle therebetween, then it is possible to think that the second virtual node is present in the neighborhood of the first virtual node. The generating unit 135 can make use of the angle between the first edge, on which the first node is placed, and the other edge in such a way that the second virtual node is not placed in the neighborhood of the first virtual node.

In the example illustrated in FIG. 9, the generating unit 135 places the virtual node V3 on the edge joining the node N1 to the node N4. The determining unit 134 determines that an angle A1 between the edge on which the virtual node V3 is placed and the edge joining the node N1 to the node N3 does not satisfy the predetermined condition regarding addition of virtual nodes. Moreover, the determining unit 134 determines that an angle A2 between the edge on which the virtual node V3 is placed and the edge joining the node N1 to the node N5 also does not satisfy the predetermined condition regarding addition of virtual nodes. On the other hand, the determining unit 134 determines that the angle between the edge on which the virtual node V3 is placed and the edge joining the node N1 to the node N2 satisfies the predetermined condition regarding addition of virtual nodes. In an identical manner, the determining unit 134 determines that the angle between the edge on which the virtual node V3 is placed and the edge joining the node N1 to the node N7 satisfies the predetermined condition regarding addition of virtual nodes. As a result, the generating unit 135 adds the virtual nodes VN1, VN3, VN5, and VN6 in the graph G1. In this way, the generating unit 135 generates the intermediate state graph ISG2 from the graph G1.

In an identical manner to the exemplary embodiment described earlier, subsequently, the generating unit 135 performs the edge assignment operation for assigning edges to the virtual nodes. In the example illustrated in FIG. 9, the information processing apparatus 100 assigns edges to the virtual nodes VN1, VN3, VN5, and VN6. In this way, the generating unit 135 generates the graph G3 from the intermediate state graph ISG2.

7-2. Adjustment of Virtual Nodes Based on Distances Therebetween

In some embodiments, the generating unit 135 can delete such virtual nodes, from among a plurality of virtual nodes included in the second-type graph, which have the distance to another virtual node satisfying a predetermined condition. In some embodiments, from among a plurality of virtual nodes included in the second-type graph, the generating unit 135 can delete virtual nodes that have the distance to another virtual node to be equal to or smaller than a predetermined value.

In some embodiments, the generating unit 135 can integrate a group of such virtual nodes, from among a plurality of virtual nodes included in the second-type graph, which have the distance satisfying a predetermined condition into a single virtual node. In some embodiments, the generating unit 135 can integrate a group of such virtual nodes which have the distance to another virtual node to be equal to or smaller than a predetermined value into a single virtual node. In some embodiments, the generating unit 135 can integrate a group of such virtual nodes, from a plurality of virtual nodes included in a second-type graph, which are generated by a predetermined clustering operation into a single virtual node. In some embodiments, the generating unit 135 can delete the virtual nodes included in the group of virtual nodes, and can add the integrated virtual node in the second-type graph.

Figure 10:
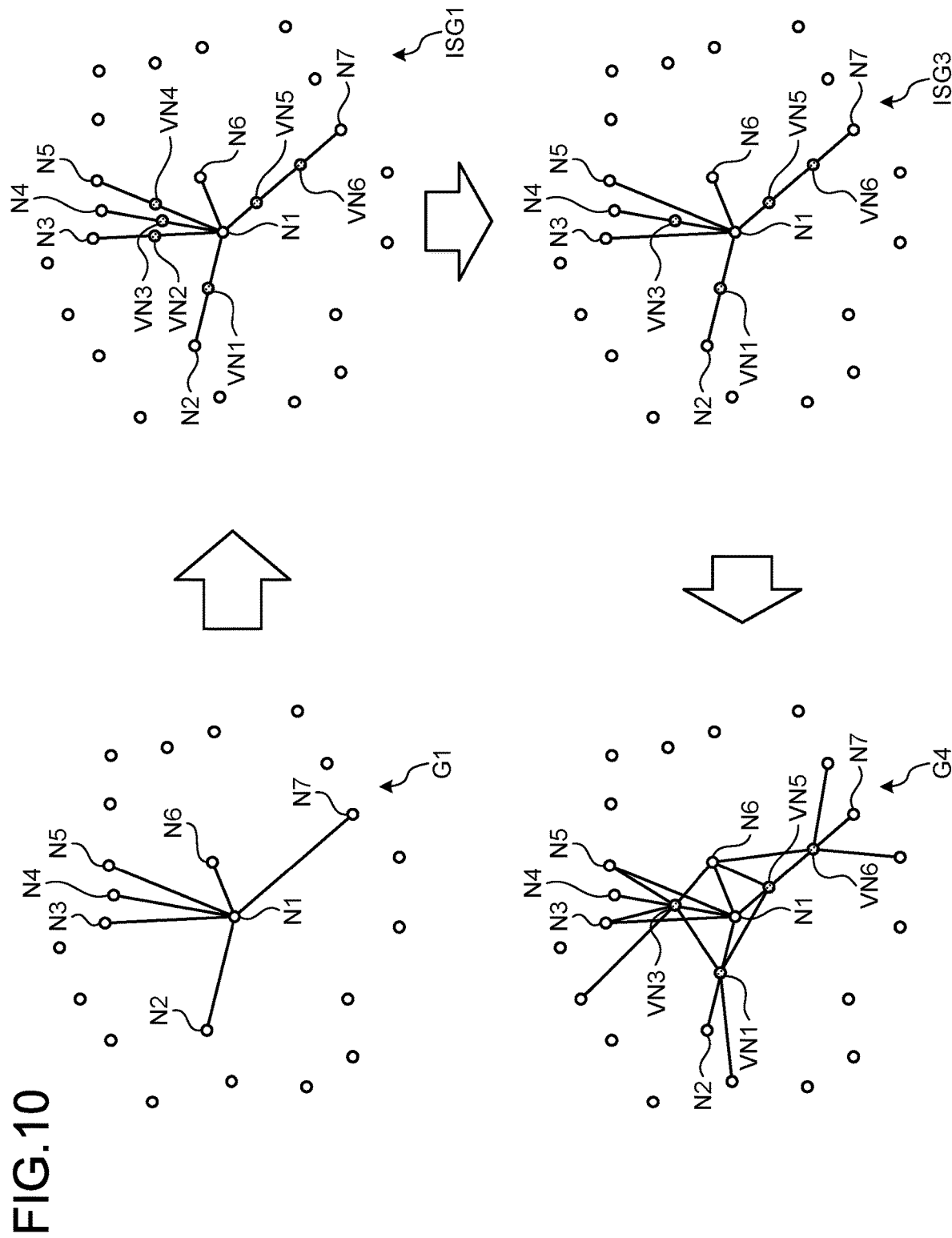

FIG. 10 is a diagram illustrating an example of the graph generating operation for generating a graph. The graph generation operation includes the following four steps: 1) selection of the target node for processing from an already-generated graph; 2) addition of virtual nodes in the already-generated graph; 3) adjustment of the virtual nodes; and 4) assignment of edges to the virtual nodes. The first step, the second step, the third step, and the fourth step respectively correspond to the initial state, a first intermediate state, a second intermediate state, and the final state of the graph. In the example illustrated in FIG. 10, a new graph G4 is generated from the already-generated graph G1 via intermediate state graphs ISG1 and ISG3. In FIG. 10, a "white arrow" indicates that the graph generation operation proceeds to the next step.

In some implementations, the information processing apparatus 100 can adjust the virtual nodes based on "the distances among the virtual nodes". Given below is the explanation of various implementation forms of "the adjustment of the virtual nodes based on the distances among them".

In an identical manner to the exemplary embodiment described earlier, firstly, the obtaining unit 132 of the information processing apparatus 100 obtains an already-generated graph. In the example illustrated in FIG. 10, the obtaining unit 132 obtains the graph G1 from the graph information storing unit 122. Then, the selecting unit 133 of the information processing apparatus 100 selects the target node for processing from among the nodes included in the already-generated graph. In the example illustrated in FIG. 10, the selecting unit 133 selects the node N1 as the target node for processing.

In an identical manner to the exemplary embodiment described earlier, subsequently, the determining unit 134 of the information processing apparatus 100 determines whether the target node for processing, which is selected by the selecting unit 133, and another node satisfy a predetermined condition regarding addition of virtual nodes. If the determining unit 134 determines that the target node for processing and the other node satisfy the predetermined condition regarding addition of virtual nodes, the generating unit 135 of the information processing apparatus 100 adds virtual nodes in the already-generated graph and generates a first intermediate state graph.

In the example illustrated in FIG. 10, the generating unit 135 adds the virtual nodes VN1, VN2, VN3, VN4, VN5, and VN6 in the graph G1. In this way the generating unit 135 generates the intermediate state graph ISG1 from the graph G1.

Then, the generating unit 135 determines whether an added virtual node and another added virtual node satisfy a predetermined condition regarding adjustment of virtual nodes. If it is determined that the added virtual node and the other added virtual node satisfy the predetermined condition regarding adjustment of virtual nodes, the generating unit 135 deletes the other added virtual node and generates a second intermediate state graph.

If the distance between two added virtual nodes does not satisfy a threshold value, then the determining unit 134 can delete one of the two added virtual nodes before the generation of edges. For example, the determining unit 134 calculates the distance between two added virtual nodes. Then, the determining unit 134 determines whether the calculated distance satisfies a predetermined condition regarding adjustment of virtual nodes. The predetermined condition regarding adjustment of virtual nodes can indicate, for example, that "the calculated distance is shorter than a predetermined value". If the determining unit 134 determines that the calculated distance satisfies the predetermined condition regarding adjustment of virtual nodes, then the generating unit 135 deletes one of the two added virtual nodes before the generation of edges.

In the example illustrated in FIG. 10, the determining unit 134 determines that the distance between the virtual nodes VN3 and VN2 satisfies the predetermined condition regarding adjustment of virtual nodes. Moreover, the determining unit 134 determines that the distance between the virtual nodes VN3 and VN4 also satisfies the predetermined condition regarding adjustment of virtual nodes. On the other hand, the determining unit 134 determines that the distance between the virtual nodes VN3 and VN1 does not satisfy the predetermined condition regarding adjustment of virtual nodes. In an identical manner, the determining unit 134 determines that the distance between the virtual nodes VN3 and VN5 as well as the distance between the virtual nodes VN3 and VN6 does not satisfy the predetermined condition regarding adjustment of virtual nodes. As a result, the generating unit 135 deletes the virtual nodes VN2 and VN4 from the graph G1. In this way, the generating unit 135 generates the intermediate state graph ISG3 from the intermediate state graph ISG1.

In an identical manner to the exemplary embodiment described earlier, subsequently, the generating unit 135 performs the edge assignment operation for assigning edges to the virtual nodes. In the example illustrated in FIG. 10, the information processing apparatus 100 assigns edges to the virtual nodes VN1, VN3, VN5, and VN6. In this way, the generating unit 135 generates the graph G4 from the intermediate state graph ISG3.

The generating unit 135 can add a virtual node in such a way that it is shared with the nodes. In the example illustrated in FIG. 10, the generating unit 135 can delete the virtual nodes VN2, VN3, and VN4. Then, the generating unit 135 can add, as new virtual nodes, the average vectors of the objects corresponding to the virtual nodes VN2, VN3, and VN4. In some implementations, the generating unit 135 can implement a clustering method such as the K-means method, and classify the objects corresponding to the virtual nodes (i.e., classify the sets of vector data) into K number of clusters (where K is an arbitrary natural number). Then, the generating unit 135 can add the representative vector (i.e., the centroid) of each cluster as a new virtual node.

7-3. Addition of Virtual Nodes Based on New Neighboring Nodes

In some embodiments, when a disconnected node, which is not joined to the target node by an edge, and the target node satisfy a predetermined condition, the generating unit 135 can generate a second-type graph by adding virtual nodes. For example, when a disconnected node, which is included in a group of nodes that are greater in number than the number of edges joined to the target node and that are extracted as the neighboring nodes of the target node, and the target node satisfy a predetermined condition; the generating unit 135 can add virtual nodes. Moreover, for example, if the distance between the target node and the disconnected node is equal to or greater than a predetermined threshold value, then the generating unit 135 can add virtual nodes in between the target node and the disconnected node.

Figure 11:
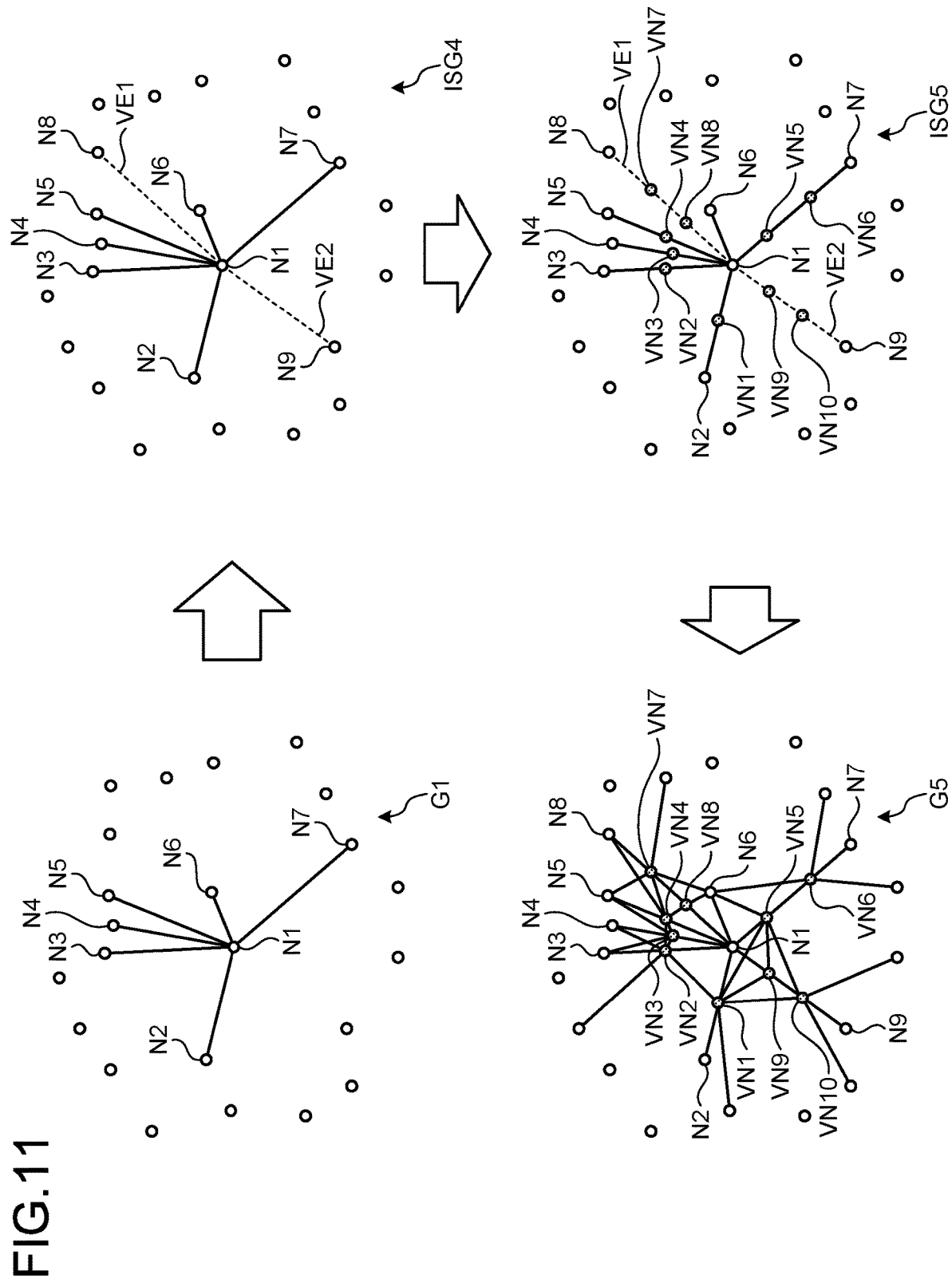

FIG. 11 is a diagram illustrating an example of the graph generation operation performed for generating a graph. The graph generation operation includes the following four steps: 1) selection of the target node for processing from an already-generated graph; 2) searching for new neighboring nodes; 3) addition of virtual nodes in the intermediate state graph; and 4) assignment of edges to the virtual nodes. The first step, the second step, the third step, and the fourth step respectively correspond to the initial state, a first intermediate state, a second intermediate state, and the final state of the graph. In the example illustrated in FIG. 11, a new graph G5 is generated from the already-generated graph G1 via intermediate state graphs ISG4 and ISG5. In FIG. 11, a "white arrow" indicates that the graph generation operation proceeds to the next step.

In some implementations, the information processing apparatus 100 can add virtual nodes based on "new neighboring nodes". Given below is the explanation of various implementation forms of "addition of virtual nodes based on new neighboring nodes".

In an identical manner to the exemplary embodiment described above, firstly, the obtaining unit 132 of the information processing apparatus 100 obtains an already-generated graph. In the example illustrated in FIG. 11, the obtaining unit 132 obtains the graph G1 from the graph information storing unit 122. Then, the selecting unit 133 of the information processing apparatus 100 selects the target node for processing from among the nodes included in the already-generated graph. In the example illustrated in FIG. 11, the selecting unit 133 selects the node N1 as the target node for processing.

Then, the generating unit 135 of the information processing apparatus 100 uses the already-generated graph and searches for a new neighboring node of the target node for processing. Subsequently, the generating unit 135 adds the retrieved new neighboring node in the already-generated graph and generates a first intermediate state graph.

Herein, adding the retrieved new neighboring node in the already-generated graph includes connecting the retrieved new neighboring node and the target node for processing by a new edge. In order to distinguish the original edges in the already-generated graph from the new edge; in the present written description, the edge connecting the target node for processing to the new neighboring node is sometimes called a "virtual edge".

Meanwhile, there are times when, regardless of the fact that a first node is present in the neighborhood of a second node, the first node is not connected to the second node by an edge. The generating unit 135 obtains such a new neighboring node. Then, the generating unit 135 places that virtual node on a new edge that is different than the edges preassigned to the nodes in the already-generated graph. For example, the generating unit 135 generates, as a virtual edge, an edge connecting the target node for processing to the new neighboring node. The generating unit 135 can calculate the distance between the target node for processing and another node. If the calculated distance satisfies a threshold value, then the generating unit 135 can obtain the other node as a new neighboring node of the target node for processing.

In the example illustrated in FIG. 11, the generating unit 135 connects a new neighboring node N8 to the node N1 by a virtual edge VE1. Moreover, the generating unit 135 connects a new neighboring node N9 to the node N1 by a virtual edge VE2. In this way, the generating unit 135 generates the intermediate state graph ISG4 from the graph G1.

In an identical manner to the exemplary embodiment described earlier, subsequently, the determining unit 134 of the information processing apparatus 100 determines whether the target node for processing, which is selected by the selecting unit 133, and another node satisfy a predetermined condition regarding addition of virtual nodes. Herein, the other node is, for example, the retrieved new neighboring node. If the determining unit 134 determines that the target node for processing and the other node satisfy the predetermined condition regarding addition of virtual nodes, then the generating unit 135 of the information processing apparatus 100 adds virtual nodes in the already-generated graph and generates a second intermediate state graph.

In the example illustrated in FIG. 11, the generating unit 135 adds virtual nodes VN1, VN2, VN3, VN4, VN5, VN6, VN7, VN8, VN9, and VN10 in the intermediate state graph ISG4. In this way, the generating unit 135 generates the intermediate state graph ISG5 from the intermediate state graph ISG4.

In an identical manner to the exemplary embodiment described earlier, subsequently, the generating unit 135 performs the edge assignment operation for assigning edges to the virtual nodes. In the example illustrated in FIG. 11, the information processing apparatus 100 assigns edges to the virtual nodes VN1, VN2, VN3, VN4, VN5, VN6, VN7, VN8, VN9, and VN10. In this way, the generating unit 135 generates the graph G5 from the intermediate state graph ISG5.

7.4. Addition of Virtual Nodes Based on Density of Nodes

In some embodiments, the generating unit 135 can generate a second-type graph by add virtual nodes in a space having low density of the nodes in the first-type graph.

The generating unit 135 can generate a graph by placing virtual nodes in a space having low density of objects (i.e., sets of vector data). As an example, the density of an object can represent the number of other nodes within the distance r (where r is an arbitrary real number) from the coordinates of the node corresponding to that object. If the density of a node does not satisfy a threshold value, then the generating unit 135 can place virtual nodes in the area within the distance r from the coordinates of that node. As another example, the generating unit 135 can use a hyperplane or a hypersphere and divide the vector space of the object into a plurality of local areas. In that case, the density of an object can be the local density based on the number of nodes included in each local area. If the local density does not satisfy a threshold value, then the generating unit 135 can place virtual nodes in the local area.

7-5. Deletion of Original Edges

In some implementations, if a virtual node is placed on the edge that is preassigned to a node in an already-generated graph, then the generating unit 135 can delete that node. Moreover, the generating unit 135 can perform the edge assignment operation for assigning an edge to the virtual node. For example, when a virtual node is placed on the original node connecting a first node and a second node, the generating unit 135 can delete that original node. Then, the generating unit 135 can perform the edge assignment operation for assigning edges to the virtual node, and generate a first edge connecting the virtual node to the first node and generate a second edge connecting the virtual node to the second node. As a result, the information processing apparatus 100 enables achieving improvement in the search accuracy.

In some implementations, the generating unit 135 can delete all original edges on which virtual nodes are placed. Then, the generating unit 135 can perform the edge assigning operation for assigning edges to connect all original nodes to the virtual nodes.

7-6. Offset of Virtual Nodes

Based on the offset with reference to the coordinates of an edge, the generating unit 135 can place virtual nodes in the vector space separated from the edge by a predetermined distance. Based on the offset with reference to the coordinates of the target node for processing, the generating unit 135 can place virtual nodes in the neighborhood of the target node for processing (for example, the vector space separated from the target node for processing by a predetermined distance). Based on the offset with reference to the coordinates of another node connected to the target node for processing by an edge, the generating unit 135 can place virtual nodes in the neighborhood of the other node (for example, in the vector space separated from the other node by a predetermined distance).

7-7. Application Example of Graph

In some embodiments, based on the placement of a plurality of nodes in a first-type graph that includes a plurality of nodes corresponding to a plurality of transaction targets handled in an electronic business transaction service; the generating unit 135 generates a second-type graph that includes virtual nodes that are not associated to any transaction target handled in the electronic business transaction service by adding, in the first-type graph, the virtual nodes. For example, either in the case in which, from among a plurality of nodes included in the first-type graph and corresponding to a plurality of transaction targets handled in an electronic business transaction service, at least two nodes satisfy a first predetermined condition, or in the case in which the edges joining the nodes in the first-type graph satisfy a predetermined second condition; the generating unit 135 can add, in the first-type graph, virtual nodes that are not associated to any transaction target handled in the electronic business transaction service, and generate a second-type graph that includes the virtual nodes. The obtaining unit 132 can obtain the first-type graph that includes a plurality of nodes corresponding to a plurality of transaction targets handled in an electronic business transaction service and that includes the edges joining those nodes. The selecting unit 133 can select, from among a plurality of nodes, the target node for performing the virtual node addition operation to add virtual nodes that are not associated to any transaction target handled in the electronic business transaction service.

The graph generated by the generating unit 135 can be used in searching for multimedia data such as still images, dynamic picture images, and music. As explained earlier with reference to FIGS. 1 and 2, the generated graph can be applied to a variety of information retrieval including similar-image retrieval. For example, when the extracted features indicate image features, the generated graph can be applied to similar-image retrieval. Alternatively, for example, if the extracted features indicate word embedding, then the generated graph can be applied to similar-word retrieval.

8. Supplementary Explanation

Of the operations described above in the embodiments, all or part of the operations explained as being performed automatically can be performed manually. Similarly, all or part of the operations explained as being performed manually can be performed automatically by a known method. The processing procedures, the control procedures, specific names, various data, and information including parameters described in the embodiments or illustrated in the drawings can be changed as required unless otherwise specified. For example, the variety of information illustrated in the drawings is not limited to that information.

The constituent elements of the devices illustrated in the drawings are merely conceptual, and need not be physically configured as illustrated. The constituent elements, as a whole or in part, can be separated or integrated either functionally or physically based on various types of loads or use conditions.

For example, some or all of the memory unit 120 illustrated in FIG. 3 need not be held in the information processing apparatus 100, and can alternatively be held in a storage server. In that case, the information processing apparatus 100 accesses the storage server and obtains a variety of information such as object information or graph information.

9. Hardware Configuration

The information processing apparatus 100 according to the embodiment described above is implemented using a computer 1000 having a configuration as illustrated in FIG. 11, for example. FIG. 11 is a diagram illustrating an exemplary hardware configuration. The computer 1000 is connected to an output device 1010 and an input device 1020, and has a configuration in which an arithmetic processing device 1030, a primary storage device 1040, a secondary storage device 1050, an output interface (IF) 1060, an input IF 1070, and a network IF 1080 are connected by a bus 1090.

The arithmetic processing device 1030 operates based on computer programs stored in the primary storage device 1040 or the secondary storage device 1050 or based on the computer programs read from the input device 1020; and performs a variety of processing. The primary storage device 1040 is a memory device for temporarily storing data used in a variety of arithmetic processing performed by the arithmetic processing device 1030. The secondary storage device 1050 is a storage device that is used to store data useful in a variety of arithmetic processing performed by the arithmetic processing device 1030 and that is used to register various databases. The secondary storage device 1050 is implemented using a read only memory (ROM), a hard disk drive (HDD), or a flash memory.

The output IF 1060 is an interface for sending target information for output to the output device 1010 such as a monitor or a printer that outputs a variety of information. For example, the output IF 1060 is implemented using a connector compatible to the universal serial bus (USB), or the digital visual interface (DVI), or the high definition multimedia interface (HDMI) (registered trademark). The input IF 1070 is an interface for receiving information from various input devices 1020 such as a mouse, a keyboard, and a scanner. The input IF 1070 is implemented using an USB.

The input device 1020 can be a device for reading information from, for example, an optical recording medium such as a compact disc (CD), a digital versatile disc (DVD), or a phase change rewritable disk (PD); or a magnetic recording medium such as a magneto-optical disk; or a tape medium; or a magnetic recording medium; or a semiconductor memory. Alternatively, the input device 1020 can be an external storage medium such as a USB memory.

The network IF 1080 receives data from other devices via the network N and sends it to the arithmetic processing device 1030, and sends data generated by the arithmetic processing device 1030 to other devices via the network N.

The arithmetic processing device 1030 controls the output device 1010 and the input device 1020 via the output IF 1060 and the input IF 1070, respectively. For example, the arithmetic processing device 1030 loads computer programs from the input device 1020 or the secondary storage device 1050 into the primary storage device 1040, and executes the loaded computer programs.

For example, when the computer 1000 functions as the information processing apparatus 100, the arithmetic processing device 1030 of the computer 1000 executes computer programs loaded in the primary storage device 1040 and implements the functions of the control unit 130.

10. Effect

As explained above, the information processing apparatus 100 according to the embodiments includes the obtaining unit 132 and the generating unit 135.

In the information processing apparatus 100 according to the embodiments, obtaining unit 132 obtains a first-type graph including a plurality of node corresponding to a plurality of search target. The generating unit 135 generates, based on placement of the plurality of nodes in the first-type graph, a second-type graph that includes a virtual node representing a node not associated to a search target by adding the virtual node to the first-type graph.

Moreover, in the information processing apparatus 100 according to the embodiments, either in the case in which, from among a plurality of nodes included in the first-type graph and corresponding to a plurality of search targets, at least two nodes satisfy a first predetermined condition, or in the case in which the edges joining the nodes in the first-type graph satisfy a predetermined second condition; the generating unit 135 generates a second-type graph that includes the virtual nodes by adding, in the first-type graph, virtual nodes that are not associated to any search target.

Furthermore, in the information processing apparatus 100 according to the embodiments, when the target node, with respect to which virtual nodes are to be added, and another node satisfy a predetermined condition; the generating unit 135 generates a second-type graph that includes the virtual nodes by adding virtual nodes.

Moreover, in the information processing apparatus 100 according to the embodiments, when the edge joining the target node and another node satisfies a predetermined condition, the generating unit 135 generates a second-type graph by adding virtual nodes.

Furthermore, in the information processing apparatus 100 according to the embodiments, the generating unit 135 generates a second-type graph by adding virtual nodes in between the target node and another node in the first-type graph.

Moreover, in the information processing apparatus 100 according to the embodiments, when the length of the edge joining the target node and another node is equal to or greater than a predetermined threshold value, the generating unit 135 generates a second-type graph by adding virtual nodes in between the target node and the other node.

Furthermore, in the information processing apparatus 100 according to the embodiments, the generating unit 135 generates a second-type graph by treating, as the target node, the node for which the shortest edge from among the edges joined thereto has a greater length than a predetermined value.

Moreover, in the information processing apparatus 100 according to the embodiments, when a disconnected node, which is not joined to the target node by an edge, and the target node satisfy a predetermined condition, the generating unit 135 generates a second-type graph by adding virtual nodes and generates a second-type graph.

Furthermore, in the information processing apparatus 100 according to the embodiments, when a disconnected node, which is included in a group of nodes that are greater in number than the number of edges joined to the target node and that are extracted as the neighboring nodes of the target node, and the target node satisfy a predetermined condition; the generating unit 135 adds virtual nodes.

Moreover, in the information processing apparatus 100 according to the embodiments, when the distance between the target node and the disconnected node is equal to or greater than a predetermined threshold value, the generating unit 135 adds a virtual node in between the target node and the disconnected node.

Furthermore, in the information processing apparatus 100 according to the embodiments, the generating unit 135 generates a second-type graph by adding a plurality of virtual nodes in between the target node and another node.

Moreover, in the information processing apparatus 100 according to the embodiment, the generating unit 135 generates a second-type graph by adding virtual nodes having the count in accordance with the length of the edge joining the target node and another node.

Furthermore, in the information processing apparatus 100 according to the embodiments, the generating unit 135 generates a second-type graph by adding a number of virtual nodes in proportion to the length of the edge joining the target node and the other node.

Moreover, in the information processing apparatus 100 according to the embodiments, the generating unit 135 generates a second-type graph by deleting the edge joining the target node and the other node.

Furthermore, in the information processing apparatus 100 according to the embodiments, the generating unit 135 generates a second-type graph by adding virtual nodes on the edge joining the target node and another node.

Moreover, in the information processing apparatus 100 according to the embodiments, the generating unit 135 generates a second-type graph by adding a virtual node at the midpoint of the edge joining the target node and another node.

Furthermore, in the information processing apparatus 100 according to the embodiments, when the edge joining the target node and another node and an edge on which another virtual node is already placed make an angle greater than a predetermined value, the generating unit 135 generates a second-type graph by adding virtual nodes on the edge joining the target node and the other node.

Moreover, in the information processing apparatus 100 according to the embodiments, the generating unit 135 deletes, from among a plurality of virtual nodes included in the second-type graph, each such virtual node for which the distance to another virtual node satisfies a predetermined condition.

Furthermore, in the information processing apparatus 100 according to the embodiments, the generating unit 135 deletes, from among a plurality of virtual nodes included in the second-type graph, each such virtual node for which the distance to another virtual node is equal to or smaller than a predetermined value.

Moreover, in the information processing apparatus 100 according to the embodiments, the generating unit 135 integrates a group of such virtual nodes, from among a plurality of virtual nodes included in the second-type graph, which have the distance satisfying a predetermined condition into a single virtual node.

Furthermore, in the information processing apparatus 100 according to the embodiments, the generating unit 135 integrates a group of virtual nodes that have the distance to another virtual node to be equal to or smaller than a predetermined value into a single virtual node.

Moreover, in the information processing apparatus 100 according to the embodiments, the generating unit 135 integrates a group of such virtual nodes, from among a plurality of virtual nodes included in the second-type graph, which are generated by a predetermined clustering operation into a single virtual node.

Furthermore, in the information processing apparatus 100 according to the embodiments, the generating unit 135 deletes the virtual nodes included in the group of virtual nodes and adds a single virtual node in the second-type graph.

Moreover, in the information processing apparatus 100 according to the embodiments, the generating unit 135 adds, to the second-type graph, an edge joining a virtual node to a neighboring node that, from among the nodes included in the second-type graph, is positioned in the neighborhood of that virtual node.

Furthermore, in the information processing apparatus 100 according to the embodiments, the generating unit 135 generates a second-type graph by adding virtual nodes in a space having low density of the nodes in the first-type graph.

Moreover, in the information processing apparatus 100 according to the embodiments, either in the case in which, from among a plurality of nodes included in the first-type graph and corresponding to a plurality of transaction targets handled in an electronic business transaction service, at least two nodes satisfy a first predetermined condition, or in the case in which the edges joining the nodes in the first-type graph satisfy a predetermined second condition; the generating unit 135 generates a second-type graph that includes virtual nodes that are not associated to any transaction target handled in the electronic business transaction service by adding, in the first-type graph, the virtual nodes.

As a result of performing the operations explained above, the information processing apparatus becomes able to generate graphs having high search accuracy.

Herein, although the description is given about the embodiment of the application concerned, the technical scope of the present invention is not limited to the embodiment described above, and can be construed as embodying various deletions, alternative constructions, and modifications that may occur to one skilled in the art that fairly fall within the basic teaching herein set forth.

Meanwhile, the information processing apparatus 100 can be implemented using a plurality of server computers; or, depending on the functions, an external platform can be called using an application programming interface (API) or using network computing for the purpose of implementing those functions. Thus, the configuration is modifiable in a flexible manner.

Moreover, the terms "section", "module", and "unit" mentioned above can be read as "device" or "circuit". For example, a receiving unit can be read as a receiving device or a receiving circuit.

What is claimed is:

1. An information processing apparatus comprising:
   a memory; and
   a processor coupled to the memory and configured to perform operations comprising:
      obtaining a first-type graph including a plurality of nodes corresponding to a plurality of search targets, wherein the first-type graph is a neighborhood graph;
      generating, based on placement of the plurality of nodes in the first-type graph, a second-type graph that includes a virtual node representing a node not associated to a search target by adding the virtual node to the first-type graph;
      retrieving a neighboring node of the virtual node by using the second-type graph; and
      generating a third-type graph by connecting the virtual node and the neighboring node of the virtual node with an edge.

2. The information processing apparatus according to claim 1, wherein when at least two nodes of the plurality of nodes satisfy a first predetermined condition or when an edge joining nodes in the first-type graph satisfies a second predetermined condition, the processor generates the second-type graph by adding the virtual node in the first-type graph.

3. The information processing apparatus according to claim 2, wherein when a target node, with respect to which the virtual node is to be added, and another node satisfy a predetermined condition, the processor generates a second-type graph that includes the virtual node by adding the virtual node.

4. The information processing apparatus according to claim 3, wherein when the edge joining the target node and the other node satisfies a predetermined condition, the processor generates the second-type graph by adding the virtual node.

5. The information processing apparatus according to claim 4, wherein the processor generates the second-type graph by adding the virtual node in between the target node and the other node in the first-type graph.

6. The information processing apparatus according to claim 4, wherein when length of edge joining the target node and the other node is equal to or greater than a predetermined threshold value, the processor generates the second-type graph by adding the virtual node in between the target node and the other node.

7. The information processing apparatus according to claim 3, wherein the processor generates the second-type graph by treating, as the target node, a node for which length of shortest edge from among edges joined thereto is greater than a predetermined value.

8. The information processing apparatus according to claim 3, wherein when a disconnected node, which is not joined to the target node by an edge, and the target node satisfy a predetermined condition, the processor generates the second-type graph by adding the virtual node and generates the second-type graph.

9. The information processing apparatus according to claim 4, wherein the processor generates the second-type graph by adding a plurality of virtual nodes in between the target node and the other node.

10. The information processing apparatus according to claim 4, wherein the processor generates the second-type graph by deleting edge joining the target node and the other node.

11. The information processing apparatus according to claim 4, wherein the processor generates the second-type graph by adding the virtual node on edge joining the target node and the other node.

12. The information processing apparatus according to claim 1, wherein the processor deletes, from among a plurality of virtual nodes included in the second-type graph, a virtual node that has distance to another virtual node satisfying a predetermined condition.

13. The information processing apparatus according to claim 1, wherein the processor deletes, from among a plurality of virtual nodes included in the second-type graph, a virtual node that has distance to another virtual node to be equal to or smaller than a predetermined value.

14. The information processing apparatus according to claim 1, wherein the processor integrates a group of such virtual nodes, from among a plurality of virtual nodes included in the second-type graph, which have distance satisfying a predetermined condition into a single virtual node.

15. The information processing apparatus according to claim 1, wherein the processor integrates a group of virtual nodes that have distance to another virtual node to be equal to or smaller than a predetermined value into a single virtual node.

16. The information processing apparatus according to claim 1, wherein the processor integrates a group of such virtual nodes, from among a plurality of virtual nodes included in the second-type graph, which are generated by a predetermined clustering operation into a single virtual node.

17. The information processing apparatus according to claim 1, wherein the processor adds the virtual node in a space having low density of nodes in the first-type graph, and generates the second-type graph.

18. An information processing method implemented in a computer, the information processing method comprising:
   obtaining a first-type graph including a plurality of nodes corresponding to a plurality of search targets, wherein the first-type graph is a neighborhood graph;
   generating, based on placement of the plurality of nodes in the first-type graph, a second-type graph that includes a virtual node representing a node not associated to a search target by adding the virtual node to the first-type graph;
   retrieving a neighboring node of the virtual node by using the second-type graph; and generating a third-type graph by connecting the virtual node and the neighboring node of the virtual node with an edge.

19. An information processing apparatus comprising:

a memory; and a processor coupled to the memory and configured to perform operations comprising:

obtaining a first-type graph including a plurality of nodes corresponding to a plurality of transaction targets handled in an electronic business transaction service, wherein the first-type graph is a neighborhood graph;

generating, based on placement of the plurality of nodes in the first-type graph, a second-type graph that includes a virtual node that is not associated to a transaction target handled in the electronic business transaction service by adding the virtual node to the first-type graph;

retrieving a neighboring node of the virtual node by using the second-type graph; and generating a third-type graph by connecting the virtual node and the neighboring node of the virtual node with an edge.

\* \* \* \* \*